US010886572B2

(12) United States Patent
Yamakaji et al.

(10) Patent No.: US 10,886,572 B2
(45) Date of Patent: Jan. 5, 2021

(54) FLEXIBLE BATTERY AND ELECTRONIC DEVICE

(71) Applicant: SEMICONDUCTOR ENERGY LABORATORY CO., LTD., Atsugi (JP)

(72) Inventors: Masaki Yamakaji, Kanagawa (JP); Junpei Momo, Kanagawa (JP); Ryota Tajima, Kanagawa (JP); Takahiro Kasahara, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 16/802,923

(22) Filed: Feb. 27, 2020

(65) Prior Publication Data

US 2020/0194845 A1  Jun. 18, 2020

Related U.S. Application Data

(63) Continuation of application No. 14/943,070, filed on Nov. 17, 2015, now Pat. No. 10,608,290.

(30) Foreign Application Priority Data

Nov. 27, 2014  (JP) ................. 2014-239736

(51) Int. Cl.
*H01M 10/42* (2006.01)
*H01M 10/48* (2006.01)
*H01M 2/02* (2006.01)
*H01M 10/0525* (2010.01)

(52) U.S. Cl.
CPC ....... *H01M 10/425* (2013.01); *H01M 2/0275* (2013.01); *H01M 2/0287* (2013.01); *H01M 10/48* (2013.01); *H01M 10/488* (2013.01); *H01M 10/0525* (2013.01); *H01M 2220/30* (2013.01); *Y02E 60/10* (2013.01)

(58) Field of Classification Search
CPC .............. H01M 10/48; H01M 10/488
See application file for complete search history.

(56) References Cited

U.S. PATENT DOCUMENTS

| | | |
|---|---|---|
| 6,599,659 B1 | 7/2003 | Endo et al. |
| 7,059,769 B1 | 6/2006 | Potega |
| 9,219,288 B2 | 12/2015 | Ahn |
| 2002/0192549 A1 | 12/2002 | Maruyama et al. |
| 2012/0183825 A1 | 7/2012 | Lee et al. |
| 2013/0134051 A1 | 5/2013 | Takahashi et al. |
| 2013/0224562 A1 | 8/2013 | Momo |
| 2015/0111088 A1 | 4/2015 | Hiroki et al. |

FOREIGN PATENT DOCUMENTS

| | | |
|---|---|---|
| CN | 201994382 U | 9/2011 |
| EP | 2343767 A | 7/2011 |
| JP | 05-196680 A | 8/1993 |
| JP | 2000-173559 A | 6/2000 |
| JP | 2002-117911 A | 4/2002 |
| JP | 2002-246027 A | 8/2002 |
| JP | 2003-151640 A | 5/2003 |
| JP | 2003-257408 A | 9/2003 |
| JP | 2008-146917 A | 6/2008 |
| JP | 2008-192432 A | 8/2008 |
| JP | 2008-251437 A | 10/2008 |
| JP | 2011-142083 A | 7/2011 |
| JP | 2011-198616 A | 10/2011 |
| JP | 2012-243556 A | 12/2012 |

OTHER PUBLICATIONS

Platinum, ESPI Metals.
Dupont Kapton Summary of Properties, pp. 1-20.

*Primary Examiner* — Ladan Mohaddes
(74) *Attorney, Agent, or Firm* — Nixon Peabody LLP; Jeffrey L. Costellia

(57) ABSTRACT

To provide a lithium-ion storage battery or electronic device that is flexible and highly safe. One embodiment of the present invention is a flexible storage battery including a positive electrode, a negative electrode, a separator between the positive electrode and the negative electrode, an exterior body that surrounds the positive electrode, the negative electrode, and the separator, and a wiring provided along the exterior body. At least part of the wiring is more easily breakable by deformation than the exterior body. The wiring is more vulnerable to deformation than the exterior body and thus damaged earlier than the exterior body. Damage to the wiring is detected and an alert is sent to a user; thus, the use of the storage battery can be stopped before the exterior body is damaged.

2 Claims, 25 Drawing Sheets

Charging

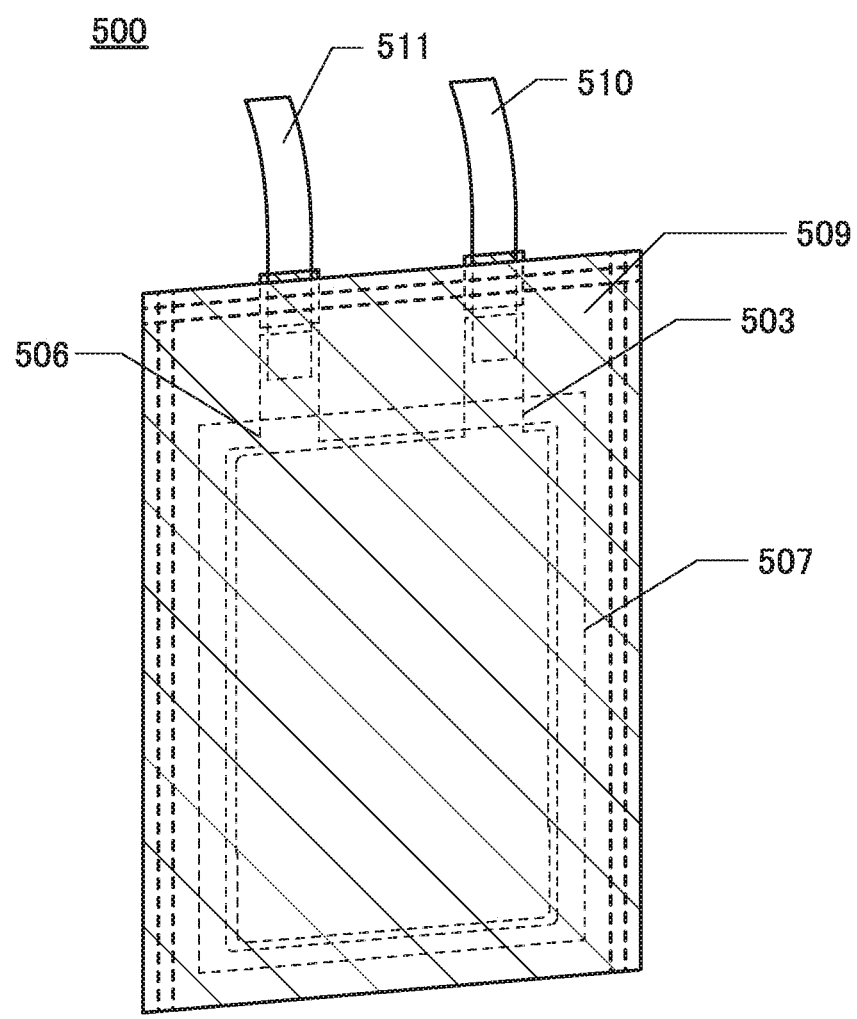

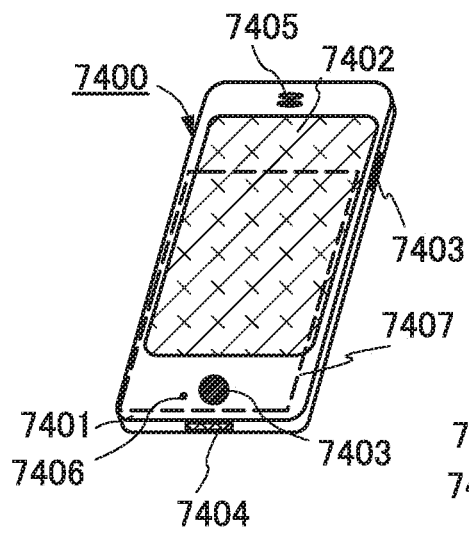
FIG. 10A
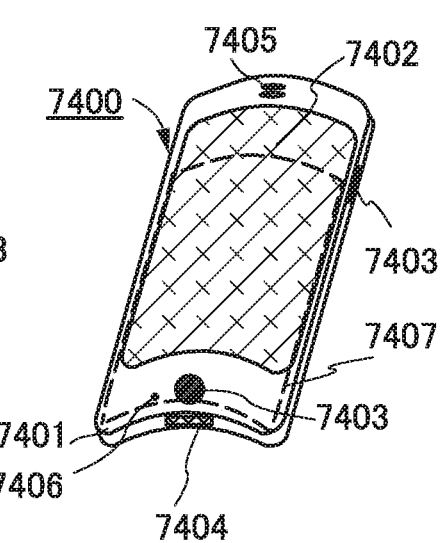
FIG. 10B
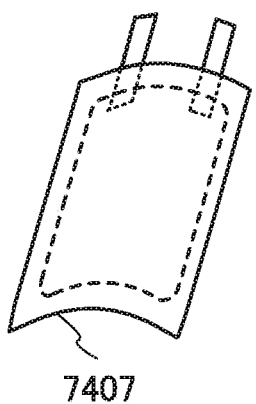
FIG. 10C
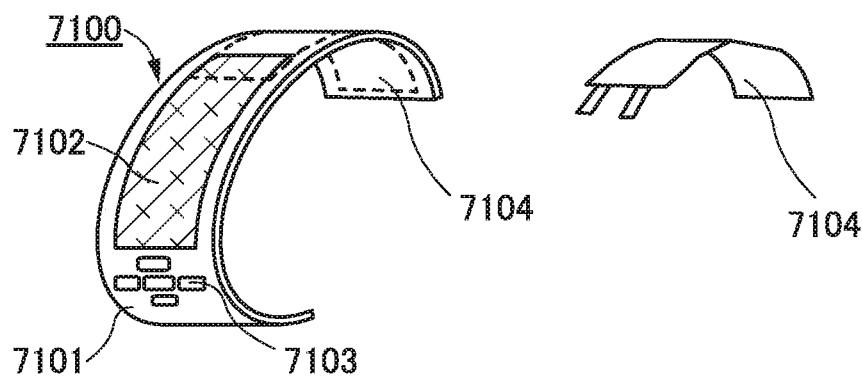
FIG. 10D
FIG. 10E FIG. 12A1
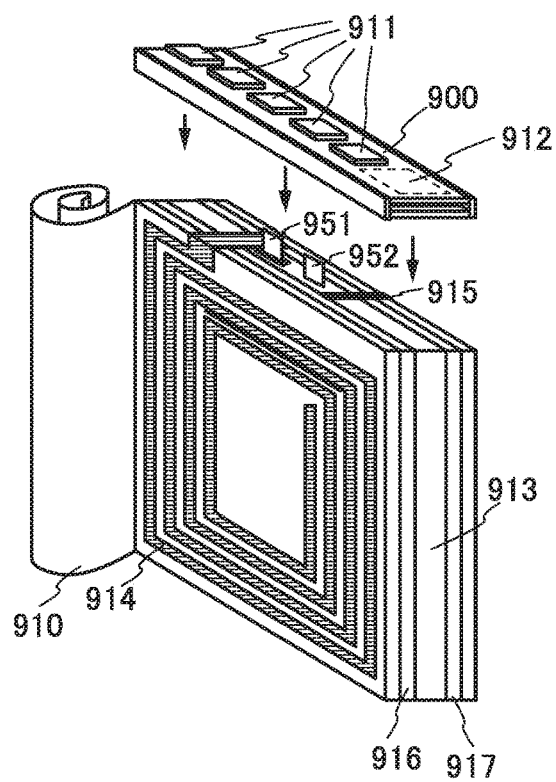
FIG. 12A2
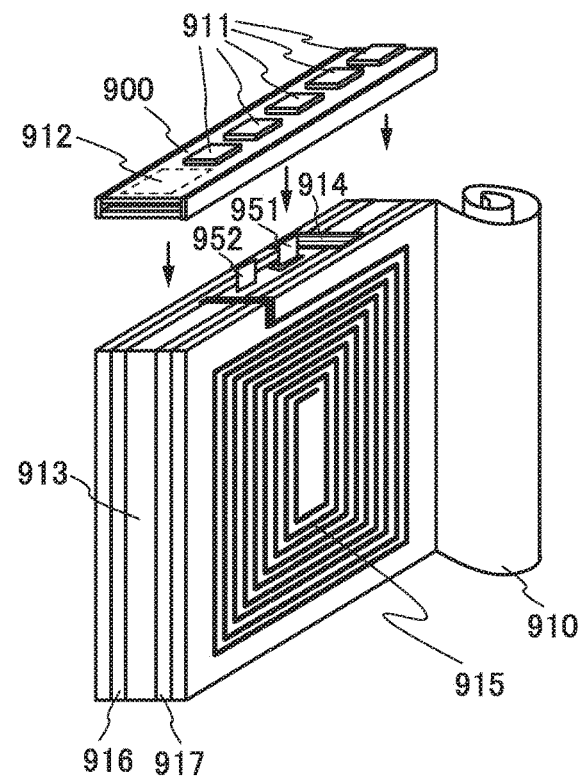
FIG. 12B1
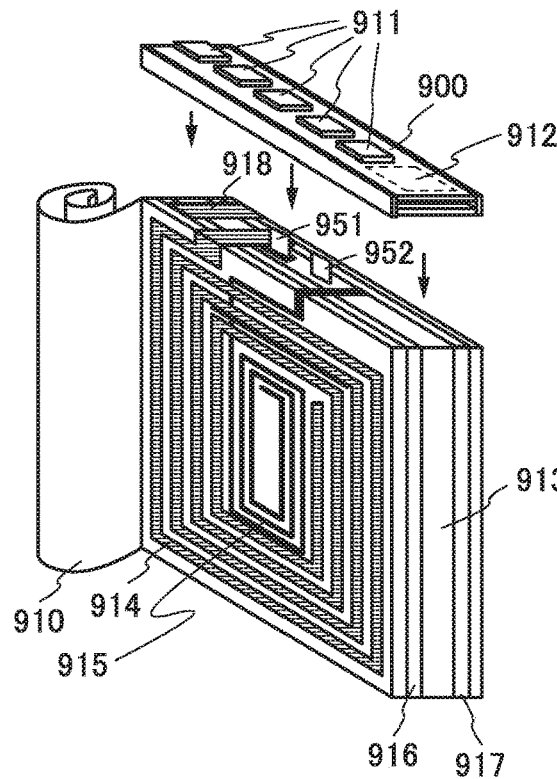
FIG. 12B2
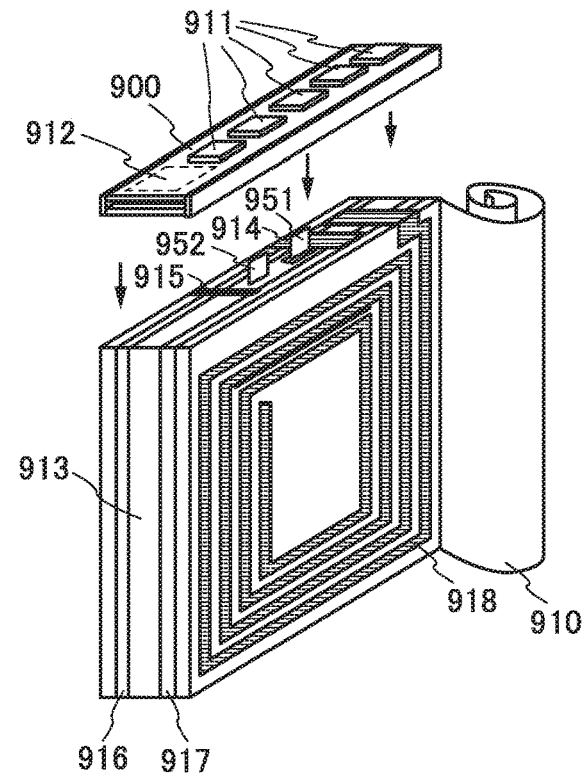

FLEXIBLE BATTERY AND ELECTRONIC DEVICE

BACKGROUND OF THE INVENTION

1. Field of the Invention

Embodiments of the present invention relate to a flexible storage battery and a flexible electronic device.

Note that one embodiment of the present invention is not limited to the above technical field. The technical field of one embodiment of the invention disclosed in this specification and the like relates to an object, a method, or a manufacturing method. One embodiment of the present invention relates to a process, a machine, manufacture, or a composition of matter. Specifically, examples of the technical field of one embodiment of the present invention disclosed in this specification include a semiconductor device, a display device, a liquid crystal display device, a light-emitting device, a lighting device, a storage battery, a storage device, a method for driving any of them, and a method for manufacturing any of them.

2. Description of the Related Art

In recent years, a variety of storage batteries such as lithium-ion storage batteries, lithium-ion capacitors, air cells, and fuel cells have been actively developed. In particular, demand for lithium-ion storage batteries with high output and high energy density has rapidly grown with the development of the semiconductor industry and with the growth of demand for energy saving, for electronic devices, for example, portable information terminals such as mobile phones, smartphones, and laptop computers, portable music players, and digital cameras; medical equipment; next-generation clean energy vehicles such as hybrid electric vehicles (HEVs), electric vehicles (EVs), and plug-in hybrid electric vehicles (PHEVs); stationary storage batteries; and the like. The lithium-ion storage batteries are essential for today's society. Furthermore, with the growing expectations for flexible devices or wearable devices in recent years, the development of lithium-ion storage batteries that have flexibility to be changed in form in accordance with a change in the form of the devices, i.e., flexible storage batteries is urgently necessary and has partly been started (Patent Document 1).

A lithium-ion storage battery, which is a nonaqueous secondary battery, includes a positive electrode, a negative electrode, a separator, a nonaqueous electrolytic solution, and an exterior body covering these components. In lithium-ion storage batteries, positive electrodes and negative electrodes are generally used; the positive electrodes each include a positive electrode current collector made of a metal such as aluminum and a positive electrode mix that includes a positive electrode active material capable of receiving and releasing lithium ions and that is applied to each surface of the positive electrode current collector, and the negative electrodes each include a negative electrode current collector made of copper or the like and a negative electrode mix that includes a negative electrode active material capable of receiving and releasing lithium ions and that is applied to each surface of the negative electrode current collector. These positive and negative electrodes are insulated from each other by a separator provided therebetween, and the positive electrode and the negative electrode are electrically connected to a positive electrode terminal and a negative electrode terminal, respectively, which are provided on the exterior body. The exterior body has a certain shape such as a cylindrical shape or a rectangular shape.

REFERENCES

Patent Document

[Patent Document 1] Japanese Published Patent Application No. 2008-146917

SUMMARY OF THE INVENTION

As the number of times a flexible lithium-ion storage battery is changed in form increases, fatigue of (damage to) an exterior body thereof holding components and an electrolytic solution of the battery accumulates. Accumulation of fatigue (damage) might break the exterior body or a sealed structure, resulting in entry of air into the storage battery. Furthermore, fatigue might build at a tab electrode (terminal portion) of each of a positive electrode and a negative electrode of the storage battery, which breaks the terminal portion and cause failure of the storage battery in some cases.

When the lithium-ion storage battery is broken and air enters therein, the components in the storage battery might react with air or moisture, generate heat, and catch fire, leading to a critical accident such as explosion. Even if a mechanism that detects a breakage of the exterior body or the like and sends an alert is introduced to prevent such a critical accident, it is difficult to preclude the accident after the exterior body or the like is broken.

For this reason, a storage battery that can send an alert to a user before fatigue of (damage to) its component accumulates to cause breakage is needed.

In view of the above, an object of one embodiment of the present invention is to provide a flexible storage battery that has a function of sending an alert to a user before its component is damaged because of fatigue (damage). Another object is to ensure the safety of a flexible storage battery.

Another object of one embodiment of the present invention is to provide a lithium-ion storage battery or electronic device that is flexible and highly safe. Another object of one embodiment of the present invention is to provide a novel lithium-ion storage battery, a novel electronic device, or the like.

Note that the descriptions of these objects do not disturb the existence of other objects. In one embodiment of the present invention, there is no need to achieve all the objects. Other objects will be apparent from and can be derived from the descriptions of the specification, the drawings, the claims, and the like.

One embodiment of the present invention is a flexible storage battery including a positive electrode, a negative electrode, a separator between the positive electrode and the negative electrode, an exterior body that surrounds the positive electrode, the negative electrode, and the separator, and a wiring provided along the exterior body. At least part of the wiring is more easily breakable by deformation than the exterior body.

One embodiment of the present invention is a flexible storage battery including a positive electrode, a negative electrode, a tab electrode, a wiring, a separator between the positive electrode and the negative electrode, and an exterior body that surrounds the positive electrode, the negative electrode, and the separator. The tab electrode is connected to one of the positive electrode and the negative electrode. The wiring is provided along the tab electrode. At least part of the wiring is more easily breakable by deformation than the tab electrode.

Note that in the flexible storage battery of one embodiment of the present invention, the wiring may be electrically connected to a first circuit configured to detect damage to the wiring. Furthermore, the flexible storage battery may include the first circuit. Furthermore, in the flexible storage battery, the first circuit may be configured to output a signal when the first circuit detects damage to the wiring; the signal is different from a signal output when the first circuit detects no damage to the wiring There may be provided a flexible electronic device including the storage battery of one embodiment of the present invention, a display portion, and the first circuit. The first circuit is electrically connected to the wiring. The first circuit is configured to detect damage to the wiring. Alternatively, there may be provided a flexible electronic device including the storage battery of one embodiment of the present invention, a display portion, and the first circuit. The first circuit is electrically connected to the wiring. The first circuit is configured to detect damage to the wiring. The display portion is configured to display an image when the first circuit detects damage to the wiring; the image is different from an image displayed when the first circuit detects no damage to the wiring.

In one embodiment of the present invention, a wiring that is more easily breakable than a component that is to get fatigued (to be damaged) is provided along the component so that the wiring is changed in form in accordance with a change in the form of the component. Thus, not only the component but also the wiring becomes fatigued (is damaged) by deformation. Fatigue (damage to) accumulated in the component is similar to that accumulated in the wiring; however, the wiring is damaged earlier than the component since the wiring is more easily breakable than the component.

Thus, a circuit connected to the wiring is configured to detect damage to the wiring. In this case, when the circuit detects damage to the wiring due to fatigue (damage), the use of a storage battery or an electronic device can be stopped. Here, the component in contact with the wiring is also correspondingly fatigued (damaged); however, it is possible to prevent the situation where the component is further fatigued and damaged by the further use of the storage battery or electronic device and an accident is caused.

One embodiment of the present invention can provide a flexible storage battery that is configured to send an alert to a user before its component is damaged because of fatigue (damage). Alternatively, one embodiment of the present invention can ensure the safety of a flexible storage battery.

Alternatively, one embodiment of the present invention can provide a lithium-ion storage battery or electronic device that is flexible and highly safe. Alternatively, one embodiment of the present invention can provide a novel lithium-ion storage battery, a novel electronic device, or the like.

Note that the description of these effects does not disturb the existence of other effects. One embodiment of the present invention does not have to have all the effects listed above. Other effects will be apparent from and can be derived from the description of the specification, the drawings, the claims, and fee like.

BRIEF DESCRIPTION OF THE DRAWINGS

FIG. 7 illustrates an appearance of a storage battery.

FIGS. 10A to 10E illustrate flexible laminated storage batteries.

FIGS. 12A1, 12A2, 12B1, and 12B2 each illustrate an example of a storage battery.

DETAILED DESCRIPTION OF THE INVENTION

Figure 1A:
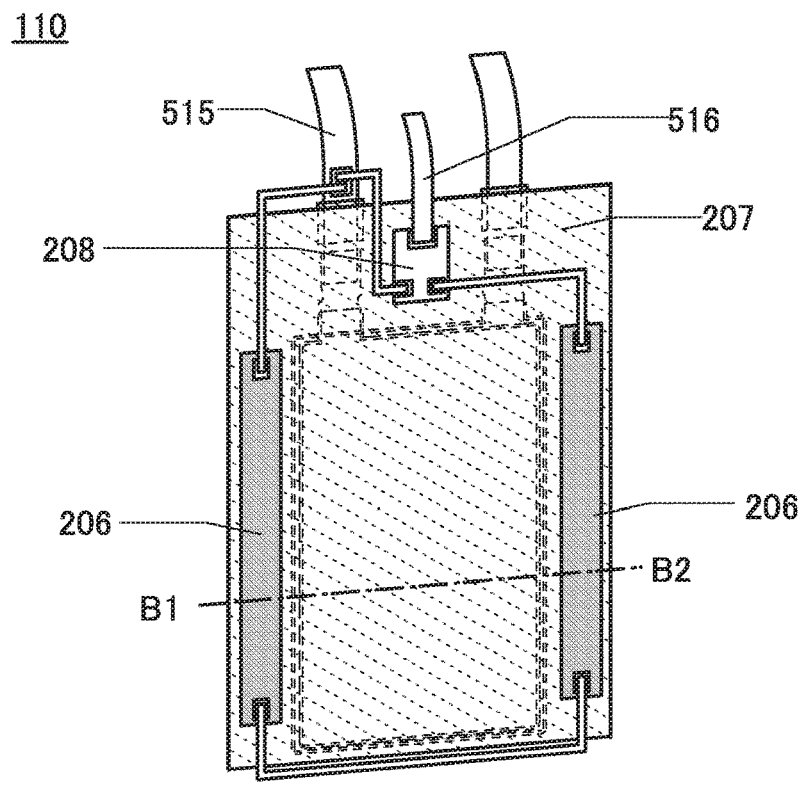
FIGS. 1A and 1B illustrate a lithium-ion storage battery of one embodiment of the present invention.

Embodiments of the present invention will be described below in detail with reference to the drawings. However, the present invention is not limited to the description below, and it is easily understood by those skilled in the art that modes and details disclosed herein can be modified in various ways. Further, the present invention is not construed as being limited to the description of the embodiments.

Note that in drawings explained in this specification, the sizes, thicknesses, or the like of components such as a positive electrode, a negative electrode, an active material layer, a separator, and an exterior body are exaggerated for simplicity of explanation in some cases. Therefore, the sizes of the components are not limited to the sizes in the drawings and relative sizes between the components.

Note that the ordinal numbers such as "first", "second", "third" in this specification and the like are used for convenience and do not denote the order of steps, the positional relation, or the like. Therefore, for example, description can be made even when "first" is replaced with "second" or "third", as appropriate. In addition, the ordinal numbers in this specification and the like are not necessarily the same as those which specify one embodiment of the present invention.

Note that in structures of the present invention described in this specification and the like, the same portions or portions having similar functions are denoted by common reference numerals in different drawings, and descriptions thereof are not repeated. Further, the same hatching pattern is applied to portions having similar functions, and the portions are not especially denoted by reference numerals in some cases.

In this specification, flexibility refers to a property of an object being flexible and bendable. In other words, it is a property of an object that can be changed in form in response to an external force applied to the object, and elasticity or restorability to the former shape is not taken into consideration. A flexible storage battery can be changed in form in response to an external force. A flexible storage battery can be used with its shape fixed in a state of being changed in form, can be used while repeatedly changed in form, and can be used in a state of not changed in form.

The descriptions in embodiments of fee present invention can be combined with each other as appropriate.

Embodiment 1

In this embodiment, a lithium-ion storage battery of one embodiment of the present invention will be described.

A method for fabricating a lithium-ion storage battery 110 of one embodiment of the present invention will be described below using FIGS. 1A and 1B. FIG. 1B is a cross-sectional view of the lithium-ion storage battery 110. In the schematic cross-sectional view, a positive electrode current collector 100, a positive electrode active material layer 101, a separator 104, a negative electrode active material layer 103, and a negative electrode current collector 102 are stacked and enclosed together with an electrolytic solution 105 by an exterior body 207. Note that the active material layers can be formed on both surfaces of the current collector, and the storage battery can have a layered structure. Furthermore, in this embodiment, wirings 206 are provided along the exterior body 207, for example. In addition, a circuit 208 connected to the wirings 206 is provided over the exterior body 207, for example.

<<Wiring and Circuit>>

The wirings 206 included in the flexible lithium-ion storage battery 110 of one embodiment of the present invention and the circuit 208 having a function of detecting damage to the wirings 206 will be described.

The wirings 206 are provided to protect a component to be protected from being damaged by being deformed. Thus, the wirings 206 are formed using a material that is less resistant to fatigue due to deformation and more likely to be damaged (e.g., fractured) than the component. The wirings 206 are provided along the component so as to be changed in form when fee component is changed in form.

In this embodiment, the wirings 206 are provided along the exterior body to protect the exterior body from being damaged because of deformation, for example. When the lithium-ion storage battery 110 provided with the wiring 206 is changed in form, components included in the lithium-ion storage battery 110 are changed in form, so that the component to be protected also gets fatigued (is also damaged). Not only the component to be protected but the wirings 206 become fatigued (is damaged) by deformation. Therefore, similar fatigue (damage) accumulates in the component and the wirings 206.

Here, since the wirings 206 are less resistant to fatigue (damage) due to deformation than the component to be protected, they are damaged (e.g., fractured) earlier than the component when fatigue of the wirings 206 builds and reaches the limit. The physical properties of the damaged wirings 206 are changed; for example, the conductivity and thermal conductivity thereof are reduced.

In view of the above, in one embodiment of the present invention, the circuit 208 having a function of detecting a change in the physical property (e.g., a reduction in conductivity) of the wirings 206 due to damage is connected to the wirings 206. Thus, when the circuit 208 detects damage to the wirings 206 due to fatigue, it can send information that damage to the wirings 206 is detected to an electronic device including the lithium-ion storage battery 110 through a tab electrode 516, so that a user of the electronic device can be notified of the information. The user who has received the notice can turn off the electronic device at the convenient timing. The component to be protected that is in contact with the wirings 206 is also correspondingly fatigued (damaged); thus, the lithium-ion storage battery 110 can be replaced with a new storage battery before the component is further fatigued and damaged by the further use of the lithium-ion storage battery 110 or the electronic device, and an accident is caused.

The circuit 208 does not necessarily notify the electronic device of the information when detecting damage to the wirings 206; in that case, a mechanism may be provided which automatically stops discharge or charge of the lithium-ion storage battery 110 with a control unit (not illustrated) that detects overdischarge, overcharge, or overcurrent of the storage battery and that is connected to the circuit 208, when damage to the wirings 206 is detected.

In either case, one embodiment of the present invention can stop the use of the lithium-ion storage battery 110 before the component thereof is damaged; accordingly, an accident can be precluded.

Here, the wirings 206 can be formed using a material that is more easily breakable than the component to be protected from being broken by fatigue (damage) due to deformation. Thus, any of a variety of materials can be used for the wirings 206 in accordance with the property of the component. Note that in this specification, the property of being easily broken or fractured by accumulation of fatigue (damage) due to deformation may be expressed by the term such as "vulnerable", "easily breakable", "having a low fatigue limit", "easily breakable by fatigue (damage) due to deformation", or "easily breakable by deformation".

An S-N curve is broadly used to express how many times of repeated stress application a material can resist or how many times of stress application and how much stress breaks the material. In general, the resistance to fatigue of a material is measured by a fatigue test (JIS: JISZ2273) of the material, and stress applied to the material in the test has an amplitude of a sine wave that is time-dependent. Such an S-N curve is obtained by plotting fatigue test results when the vertical axis represents stress amplitude and the horizontal axis represents the number of times N stress application is repeated until fracture.

In one embodiment of the present invention, the wirings 206 can be formed using a material that has an S-N curve closer to the horizontal axis than the S-N curve of the component to be protected from being broken by fatigue (damage) due to deformation. However, a material of the wirings 206 is not limited to this.

In some cases, it is difficult to take out the wirings 206 and the component to be protected from being broken by fatigue (damage) due to deformation from the lithium-ion storage battery 110 of one embodiment of the present invention and measure the resistance to fatigue (damage) due to deformation thereof. In one embodiment of the present invention, the lithium-ion storage battery 110 is repeatedly subjected to a bend test, and if the wirings 206 are broken or damaged (e.g., fractured) earlier than the component, the wirings 206 can be determined to be more vulnerable to fatigue (damage) due to deformation than the component.

Next, the circuit 208 that detects damage to the wirings 206 may be provided either in the control unit that detects overdischarge, overcharge, or overcurrent or separately from the control unit. Depending on the kind of the component to be protected from being broken by fatigue (damage) due to deformation, the circuit 208 can be included in a unit or circuit that has any other function. Note that an example of the configuration of the circuit 208 and an example of the operations thereof will be described later.

<<Structure of Positive Electrode>>

The positive electrode will be described. The positive electrode includes the positive electrode active material layer 101 and the positive electrode current collector 100.

As a material for a positive electrode active material used for the positive electrode active material layer 101, a material into and from which carrier ions such as lithium ions can be inserted and extracted can be used. Examples of the material are a lithium-containing material with an olivine crystal structure, a layered rock-salt crystal structure, or a spinel crystal structure, and the like.

Typical examples of a lithium-containing material with an olivine crystal structure ($LiMPO_4$ (general formula) (M is Fe(II), Mn(II), Co(II), or Ni(II))) are $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

For example, lithium iron phosphate ($LiFePO_4$) is preferable because it properly has properties necessary for the positive electrode active material, such as safety, stability, high capacity density, high potential, and the existence of lithium ions which can be extracted in initial oxidation (charge).

Examples of a lithium-containing material with a layered rock-salt crystal structure include lithium cobalt oxide ($LiCoO_2$), $LiNiO_2$, $LiMnO_2$, $Li_2MnO_3$, a NiCo-containing material (general formula: $LiNi_xCo_{1-x}O_2$ (0<x<1)) such as $LiNi_{0.8}Co_{0.2}O_2$, a NiMn-containing material (general formula: $LiNi_xMn_{1-x}O_2$ (0<x<1)) such as $LiNi_{0.5}Mn_{0.5}O_2$, a NiMnCo-containing material (also referred to as NMC) (general formula: $LiNi_xMn_yCo_{1-x-y}O_2$ (x>0, y>0, x+y<1)) such as $LiNi_{1/3}Mn_{1/3}Co_{1/3}O_2$. Moreover, $Li(Ni_{0.8}Co_{0.15}Al_{0.05})O_2$, $Li_2MnO_3$-$LiMO_2$ (M=Co, Ni, or Mn), and the like can be given as the examples.

In particular, $LiCoO_2$ is preferable because it has advantages such as high capacity, higher stability in the air than that of $LiNiO_2$, and higher thermal stability than that of $LiNiO_2$.

Examples of a lithium-containing material with a spinel crystal structure include $LiMn_2O_4$, $Li_{1+x}Mn_{2-x}O_4$, $Li(MnAl)_2O_4$, and $LiMn_{1.5}Ni_{0.5}O_4$.

It is preferred that a small amount of lithium nickel oxide ($LiNiO_2$ or $LiNi_{1-x}MO_2$ (M=Co, Al, or the like)) be added to a lithium-containing material with a spinel crystal structure that contains manganese, such as $LiMn_2O_4$, in which case advantages such as inhibition of the dissolution of manganese and the decomposition of an electrolytic solution can be obtained.

Alternatively, a composite oxide expressed by $Li_{(2-j)}MSiO_4$ (general formula) (M is Fe(II), Mn(II), Co(II), or Ni(II); 0≤j≤2) may be used as the positive electrode active material. Typical examples of the general formula $Li_{(2-j)}MSiO_4$ are $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNih_sCo_tMn_uSiO_4$ (r+s+t+u≤1, 0<r<1, 0<s<1, 0<r<1, and 0<u<1).

Still alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Further alternatively, for example, a compound expressed by $Li_2MPO_4F$, $Li_2MP_2O_7$, or $Li_3MO_4$ (general formula) (M=Fe or Mn), a pcrovslritc fluoride such as $NaF_3$ and $FeF_3$, a metal chalcogenide (a sulfide, a selenide, or a telluride) such as $TiS_2$ and $MoS_2$, a lithium-containing material with an inverse spinel structure such as $LiMVO_4$, a vanadium oxide ($V_2O_5$, $V_6O_{13}$, $LiV_3O_8$, or the like), a manganese oxide, or an organic sulfur compound can be used as the positive electrode active material.

In the case where carrier ions are alkali metal ions other than lithium ions, or alkaline-earth metal ions, a material containing an alkali metal (e.g., sodium and potassium) or an alkaline-earth metal (e.g., calcium, strontium, barium, beryllium, and magnesium) instead of lithium in any of the above compounds and oxides may be used as the positive electrode active material. For example, the positive electrode active material may be a sodium-containing layered oxide such as $NaFeO_2$ or $Na_{2/3}[Fe_{1/2}Mn_{1/2}]O_2$.

Further alternatively, any of the aforementioned materials may be combined to be used as the positive electrode active material. For example, a solid solution obtained by combining two or more of the above materials can be used as the positive electrode active material. For example, a solid solution of $LiCo_{1/3}Mn_{1/3}Ni_{1/3}O_2$ and $Li_2MnO_3$ can be used as the positive electrode active material.

The average diameter of primary particles of the positive electrode active material is preferably greater than or equal to 50 nm and less than or equal to 100 μm.

The positive electrode active material and a negative electrode active material have a main role in battery reactions of the storage battery, and receive and release carrier ions. To increase the lifetime of the storage battery, a material that has a small amount of capacity relating to irreversible battery reactions and has high charge and discharge efficiency is preferably used for the active materials.

The active material is in contact with an electrolytic solution. When the active material reacts with the electrolytic solution, the active material is lost and deteriorates by the reaction, which decreases the capacity of the storage battery. Therefore, it is preferable that such a reaction not be caused in the storage battery so that the storage battery hardly deteriorates.

Examples of the conductive additive of the electrode include acetylene black (AB), graphite (black lead) particles, carbon nanotubes, graphene, and fullerene.

A network for electrical conduction can be formed in the electrode by the conductive additive. The conductive additive also allows the maintenance of a path for electric conduction between the positive electrode active material particles. The addition of the conductive additive to the positive electrode active material layer 101 increases the electrical conductivity of the positive electrode active material layer 101.

As the binder, polyvinylidene fluoride (PVDF) as a typical example, polyimide, polytetrafluoroethylene, polyvinyl chloride, ethylene-propylene-diene polymer, fluorine rubber, polymethyl methacrylate, polyethylene, nitrocellulose, or the like can be used.

The binder content in the positive electrode active material layer 101 is preferably greater than or equal to 1 wt % and less than or equal to 10 wt %. more preferably greater than or equal to 2 wt % and less than or equal to 8 wt %, still more preferably greater than or equal to 3 wt % and less titan or equal to 5 wt %. The conductive additive content in the positive electrode active material layer 101 is preferably greater than or equal to 1 wt % and less than or equal to 10 wt %, more preferably greater than or equal to 1 wt % and less than or equal to 5 wt %.

In the case where the positive electrode active material layer 101 is formed by a coating method, the positive electrode active material, the binder, the conductive additive, and a dispersion medium are mixed to form an electrode slurry, and the electrode slurry is applied to the positive electrode current collector 100 and dried.

The positive electrode current collector 100 can be formed using a material which has high conductivity and is not alloyed with a carrier ion of lithium or the like, such as stainless steel, gold, platinum, aluminum, and titanium, an alloy thereof, and the like. Alternatively, an aluminum alloy to which an element that improves heat resistance, such as silicon, titanium, neodymium, scandium, and molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 100 can have a foil-like shape, a plate-like shape (sheet-like shape), a net-like shape, a punching-metal shape, an expanded-metal shape, or the like as appropriate.

Through the above steps, the positive electrode of the lithium-ion storage battery can be formed.

<<Structure of Negative Electrode>>

Next, the negative electrode will be described with reference to FIG. 1A. The negative electrode includes the negative electrode active material layer 103 and the negative electrode current collector 102. Steps of forming the negative electrode will be described below.

Examples of the carbon-based material as a negative electrode active material used for the negative electrode active material layer 103 include graphite, graphitizing carbon (soft carbon), non-graphitizing carbon (hard carbon), a carbon nanotube, graphene, carbon black, and the like. Examples of the graphite include artificial graphite such as meso-carbon microbeads (MCMB), coke-based artificial graphite, or pitch-based artificial graphite and natural graphite such as spherical natural graphite. In addition, examples of the shape of the graphite include a flaky shape and a spherical shape.

Other than the carbon-based material, a material that enables charge-discharge reactions by an alloying reaction and a dealloying reaction with lithium can be used for the negative electrode active material. A material containing at least one of Ga, Si, Al, Ge, Sn, Pb, Sb, Bi, Ag, Zn, Cd, In, and the like can be used, for example. Such elements have a higher capacity than carbon. In particular, silicon has a high theoretical capacity of 4200 mAh/g. Examples of the alloy-based material using such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, for the negative electrode active material, an oxide such as SiO, SnO, $SnO_2$, titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 $mAh/cm_3$).

When a nitride containing lithium and a transition metal is used, lithium ions are contained in the negative electrode active material and thus the negative electrode active material can be used in combination with a material for a positive electrode active material that does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material that causes a conversion reaction can be used for the negative electrode active material; for example, a transition metal oxide that does not cause an alloy reaction with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

The particle diameter of the negative electrode active material is preferably greater than or equal to 50 nm and less than or equal to 100 μm, for example.

Note that a plurality of materials for an active material can be combined at a given proportion both for the positive electrode active material layer 101 and the negative electrode active material layer 103. The use of a plurality of materials for the active material layer makes it possible to select fee property of the active material layer in more detail.

Examples of the conductive additive in the electrode include acetylene black (AB), graphite (black lead) particles, carbon nanotubes, graphene, and fullerene.

A network for electric conduction can be formed in the electrode by the conductive additive. The conductive additive also allows maintaining of a path for electric conduction between the negative electrode active material particles. The addition of the conductive additive to the negative electrode active material layer increases the electric conductivity of the negative electrode active material layer 103.

A typical example of the binder is polyvinylidene fluoride (PVDF), and other examples of the binder include polyimide, polyvinyl chloride, ethylene-propylene-diene polymer, styrene-butadiene rubber, acrylonitrile-butadiene rubber, fluorine rubber, polyvinyl acetate, polymethyl methacrylate, polyethylene, and nitrocellulose.

The content of the binder in the negative electrode active material layer 103 is preferably greater than or equal to 1 wt % and less than or equal to 10 wt %, more preferably greater than or equal to 2 wt % and less than or equal to 8 wt %, still more preferably greater than or equal to 3 wt % and less than or equal to 5 wt %. The content of the conductive additive in the negative electrode active material layer 103 is preferably greater than or equal to 1 wt % and less than or equal to 10 wt %, more preferably greater than or equal to 1 wt % and less than or equal to 5 wt %.

The negative electrode active material layer 103 is formed over the negative electrode current collector 102. In the case where the negative electrode active material layer 103 is formed by a coating method, the negative electrode active material, the binder, the conductive additive, and a dispersion medium are mixed to form a slurry, and the slurry is applied to the negative electrode current collector 102 and dried. If necessary, pressing may be performed after the drying.

The negative electrode current collector 102 can be formed using a highly conductive material that is not alloyed with a carrier ion of, for example, lithium, such as a metal typified by stainless steel, gold, platinum, iron, copper, titanium, and tantalum or an alloy thereof. Alternatively, a metal element that forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collectors can each have a foil-like shape, a plate-like shape (sheet-like shape), a net-like shape, a cylindrical shape, a coil shape, a punching-metal shape, an expanded-metal shape, or the like as appropriate. The negative electrode current collector 102 preferably has a thickness of 5 µm to 30 µm inclusive. A part of a surface of the electrode current collector may be provided with an undercoat layer using graphite or the like.

Through the above steps, the negative electrode of the lithium-ion storage battery can be formed.

<<Structure of Separator>>

The separator 104 will be described. The separator 104 may be formed using a material such as paper, nonwoven fabric, fiberglass, synthetic fiber such as nylon (polyamide), vinylon (polyvinyl alcohol based fiber), polyester, acrylic, polyolefin, or polyurethane. However, a material that does not dissolve in an electrolytic solution described later needs to be selected.

More specifically, as a material for the separator 104, any of polymer compounds based on a fluorine-based polymer, polyethers such as polyethylene oxide and polypropylene oxide, polyolefin such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane, derivatives thereof, cellulose, paper, nonwoven fabric, and fiberglass can be used either alone or in combination.

The separator 104 needs to have an insulating property of inhibiting the contact between the electrodes, a property of holding the electrolytic solution, and ionic conductivity. As a method for forming a film having a function as a separator, a method for forming a film by stretching is given. Examples of the method include a stretching aperture method in which a melted polymer material is spread, heat is released from the material, and pores are formed by stretching the resulting film in the directions of two axes parallel to the film.

To set the separator 104 in the storage battery, a method in which the separator is inserted between the positive electrode and the negative electrode can be used. Alternatively, a method in which the separator 104 is placed on one of the positive electrode and the negative electrode and then the other of the positive electrode and the negative electrode is placed thereon can be used. The positive electrode, the negative electrode, and the separator are provided in the exterior body, and the exterior body is filled with the electrolytic solution, whereby the storage battery can be fabricated.

The separator 104 with a size large enough to cover each surface of either the positive electrode or the negative electrode, in the form of a sheet or an envelope, may be made to form the electrode wrapped in the separator 104. In that case, the electrode can be protected from mechanical damages in the fabrication of the storage battery and the handling of the electrode becomes easier. The electrode wrapped in the separator and the other electrode are provided in the exterior body, and the exterior body is filled with the electrolytic solution, whereby the storage battery can be fabricated. FIG. 1B shows the cross-sectional structure of the storage battery including one pair of positive and negative electrodes.

The separator 104 may include a plurality of layers. Although the separator 104 can be formed by the above method, the range of the thickness of the film and the size of the pore in the film of the separator 104 is limited by a material of the separator 104 and mechanical strength of the film. A first separator and a second separator each formed by a stretching method may be used together in the storage battery. The first separator and the second separator can be formed using one or more kinds of material selected from the above-described materials or materials other than those described above. Characteristics such as the size of the pore in the film, the proportion of the volume of the pores in the film (also referred to as porosity), and the thickness of the film can be determined by film formation conditions, film stretching conditions, and the like. By using the first separator and the second separator having different characteristics, the properties of the separators of the storage battery can be selected more variously than in the case of using one of the separators.

Furthermore, the storage battery may be flexible. In the case where flow stress is applied to the flexible storage battery, the stress can be relieved by sliding of the first separator and the second separator at the interface between the first separator and the second separator. Therefore, the structure including a plurality of separators is also suitable as a structure of the separator in the flexible storage battery.

Through the above steps, the separator can be incorporated in the lithium-ion storage battery.

<<Components of Electrolytic Solution>>

The electrolytic solution 105 used in the lithium-ion storage battery of one embodiment of the present invention is preferably a nonaqueous solution (solvent) containing an electrolyte (solute).

As a solvent of the electrolytic solution 105, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a gelled high-molecular material is used as a solvent of the electrolytic solution 105, safety against liquid leakage and the like is improved. Furthermore, the lithium-ion storage battery can be thinner and more lightweight. Typical examples of the gelled high-molecular material include a silicone gel, an acrylic gel, an acrylonitrile gel, a polyethylene oxide-based gel, a polypropylene oxide-based gel, a fluorine-based polymer gel, and the like.

Alternatively, the use of one or more kinds of ionic liquids (also referred to as room temperature molten salts) which have features of non-flammability and non-evaporability as a solvent of the electrolytic solution can prevent the lithium-ion storage battery from exploding or catching fire even when the lithium-ion storage battery internally shorts out or the internal temperature increases owing to overcharging or the like. Thus, the lithium-ion storage battery has improved safety.

The electrolytic solution used for the storage battery is preferably highly purified and contains a small amount of dust particles and elements other than the constituent elements of the electrolytic solution (hereinafter, also simply referred to as impurities). Specifically, the mass ratio of impurities to the electrolytic solution is less than or equal to 1%, preferably less than or equal to 0.1%, more preferably less than or equal to 0.01%.

In the case of using lithium ions as carrier ions, as an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination at an appropriate ratio.

Although the case where carrier ions are lithium ions in the above electrolyte has been described, carrier ions other than lithium ions can be used. When the carrier ions other than lithium ions are alkali metal ions or alkaline-earth metal ions, instead of lithium in the lithium salts, an alkali metal (e.g., sodium or potassium) or an alkaline-earth metal (e.g., calcium, strontium, barium, beryllium, or magnesium) may be used as the electrolyte.

Note that the electrolytic solution reacts with and corrodes the positive electrode current collector in some cases. In order to inhibit such corrosion, several weight percent of $LiPF_6$ is preferably added to the electrolytic solution, in which case a passive film is formed on a surface of the positive electrode current collector and inhibits a reaction between the electrolytic solution and the positive electrode current collector. Note that for maintenance of the cycle life at high temperatures the concentration of $LiPF_6$ is less than or equal to 10 wt %, preferably less than or equal to 5 wt %, and more preferably less than or equal to 3 wt % in order that the positive electrode material layer is not dissolved.

<<Structure of Exterior Body>>

Next, the exterior body 207 will be described. As the exterior body 207, a film having a three-layer structure can be used, for example. In the three-layer structure, a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester based resin, or the like is provided as the outer surface of the exterior body over the metal thin film can be used. With such a three-layer structure, the passage of an electrolytic solution and a gas can be blocked and an insulating property and resistance to the electrolytic solution can be provided. The exterior body is folded inside in two, or two exterior bodies are stacked with the inner surfaces facing each other, in which case application of heat melts the materials on the overlapping inner surfaces to cause fusion bonding between the two exterior bodies. In this manner, a sealing structure can be formed.

A portion where the sealing structure is formed by fusion bonding or the like of the exterior body is referred to as a sealing portion. In the case where the exterior body is folded inside in two, the sealing portion is formed in the place other than the fold, and a first region of the exterior body and a second region of the exterior body that overlaps with the first region are fusion-bonded, for example. In the case where two exterior bodies are stacked, the sealing portion is formed along the entire outer region by heat fusion bonding or the like.

<<Flexible Storage Battery>>

When a flexible material is selected from materials of the members described in this embodiment and used, a flexible lithium-ion storage battery can be fabricated. Deformable devices are currently under active research and development. For such devices, flexible storage batteries are demanded.

Figure 2A:
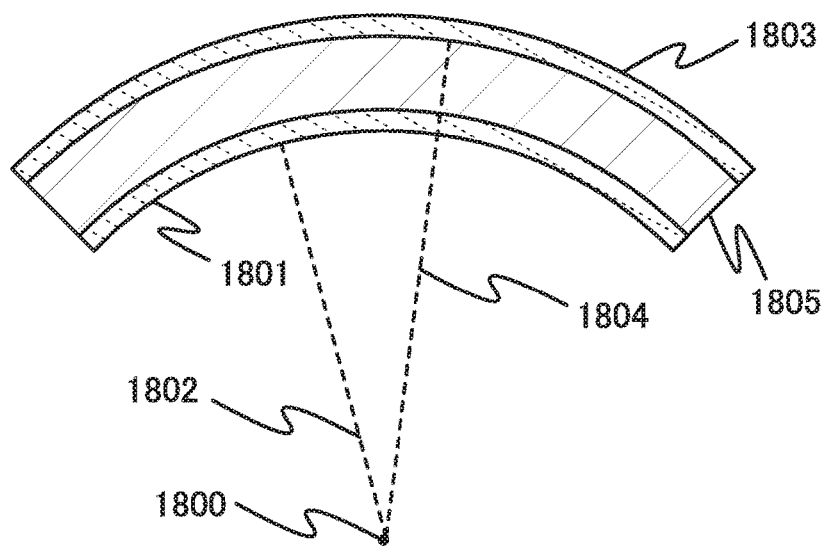
FIGS. 2A to 2D illustrate the radius of curvature.
Figure 2B:
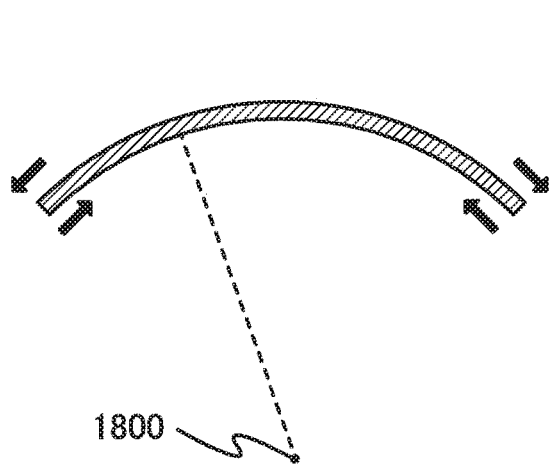

In the case of bending a storage battery in which components 1805 including electrodes and an electrolytic solution is sandwiched between two films as exterior bodies, a radius 1802 of curvature of a film 1801 close to a center 1800 of curvature of the storage battery is smaller than a radius 1804 of curvature of a film 1803 far from the center 1800 of curvature (FIG. 2A). When the storage battery is curved and has an arc-shaped cross section, compressive stress is applied to a surface of the film on the side closer to the center 1800 of curvature and tensile stress is applied to a surface of the film on the side farther from the center 1800 of curvature (FIG. 2B).

When the flexible lithium-ion storage battery is changed in form, great stress is imposed on the exterior bodies. However, by forming a pattern including projections or depressions on surfaces of the exterior bodies, the influence of a strain can be reduced to be acceptable even when compressive stress and tensile stress are applied because of deformation of the storage battery. For this reason, the storage battery can change its form such that the exterior body on the side closer to the center of curvature has a curvature radius greater than or equal to 50 mm, preferably greater than or equal to 30 mm.

Figure 3A:
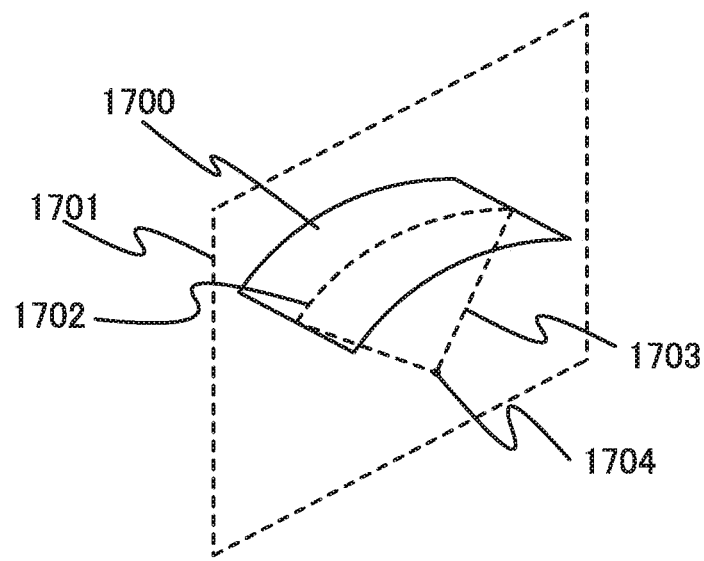
FIGS. 3A to 3C illustrate the radius of curvature.
Figure 3B:
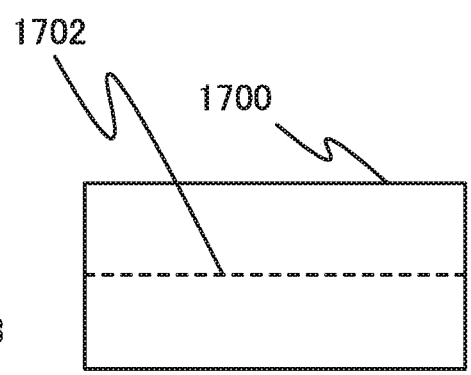
Figure 3C:
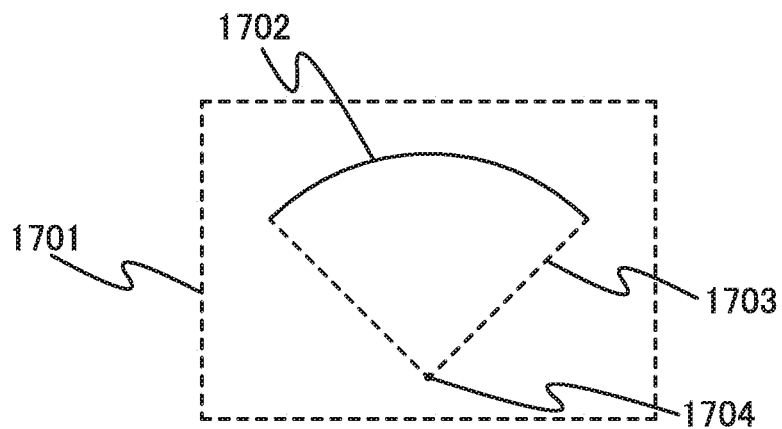

Description is given of the radius of curvature of a surface with reference to FIGS. 3A to 3C. In FIG. 3A, on a plane 1701 along which a curved surface 1700 is cut, part of a curve 1702 forming the curved surface 1700 is approximate to an arc of a circle, and the radius of the circle is referred to as a radius 1703 of curvature and the center of the circle is referred to as a center 1704 of curvature. FIG. 3B is a top view of the curved surface 1700. FIG. 3C is a cross-sectional view of the curved surface 1700 taken along the plane 1701. When a curved surface is cut along a plane, the radius of curvature of a curve in a cross section differs depending on the angle between the curved surface and the plane or on the cut position, and the smallest radius of curvature is defined as the radius of curvature of a surface in this specification and the like.

Figure 2C:
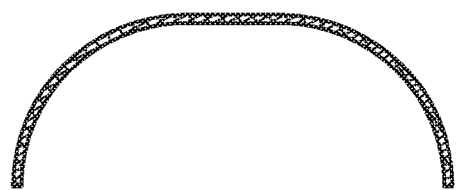
Figure 2D:

Note that the cross-sectional shape of the storage battery is not limited to a simple arc shape, and the cross section can be partly arc-shaped; for example, a shape illustrated in FIG. 2C, a wavy shape illustrated in FIG. 2D, or an S shape can be used. When the curved surface of the storage battery has a shape with a plurality of centers of curvature, the storage battery can change its form such that a curved surface with the smallest radius of curvature among radii of curvature with respect to the plurality of centers of curvature, which is a surface of the exterior body on the side closer to the center of curvature, has a curvature radius greater than or equal to 50 mm, preferably greater than or equal to 30 mm.

<<Assembly of Storage Battery and Aging>>

Figure 1B:
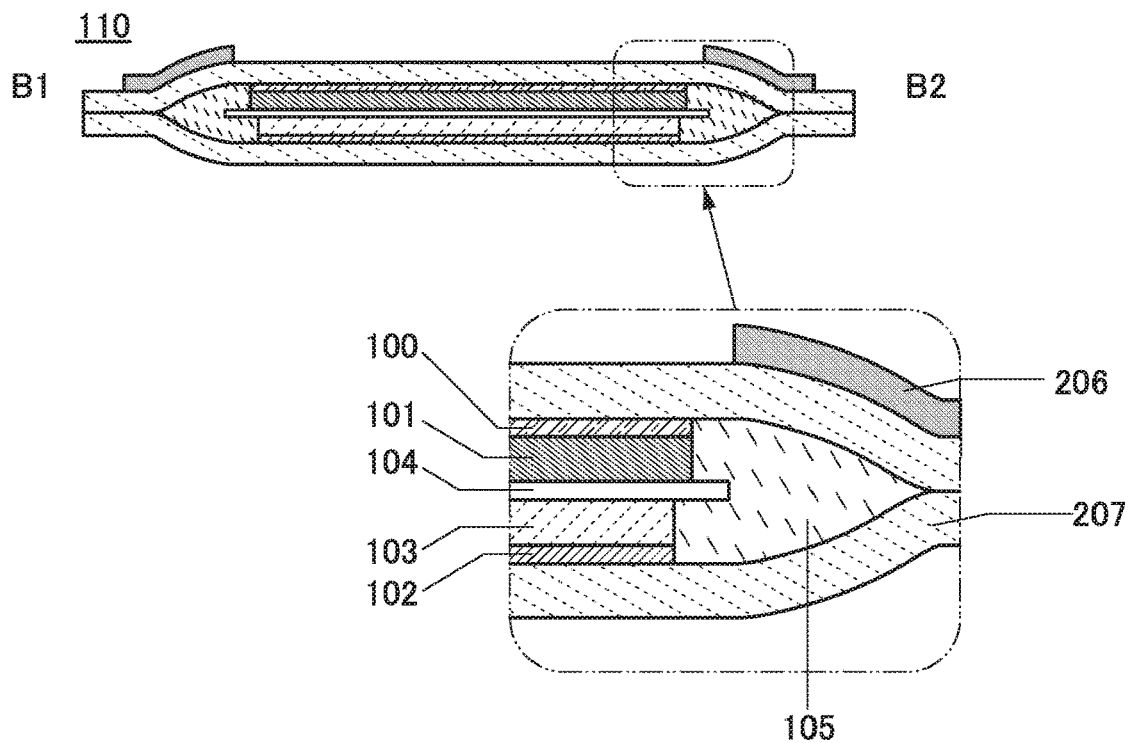

Next, the above components are combined and enclosed in the exterior body 207, so that the positive electrode current collector 100, the positive electrode active material layer 101, the separator 104, the negative electrode active material layer 103, and the negative electrode current collector 102 are stacked and enclosed in the exterior body 207 together with the electrolytic solution 105 as illustrated in FIGS. 1A and 1B.

Then, an aging process is performed. First, environmental temperature is kept at about room temperature for example, and constant current charge is performed to a predetermined voltage at a low rate. Next, a gas generated in a region inside the exterior body by charging is released outside the exterior body, and then charge is performed at a rate higher than that of the initial charge.

After that, the storage battery is kept at high temperatures for a long time. For example, the storage battery is kept at higher than or equal to 40° C. for longer than or equal to 24 hours.

After the storage battery is kept at high temperatures for a long time, gases generated in a region inside the exterior body is released again. Furthermore, the storage battery is discharged at a rate of 0.2 C at room temperature, charged at the same rate, discharged at the same rate again, and further charged at the same rate. Then, discharge is performed at the same rate. Through these steps, the aging process is terminated.

In the aforementioned manner, the storage battery of one embodiment of the present invention can be fabricated.

This embodiment can be implemented in combination with any of the other embodiments as appropriate.

Note that in the case where at least one specific example is described in a diagram or text described in one embodiment in this specification and the like, it will be readily appreciated by those skilled in the art that a broader concept of the specific example can be derived. Therefore, in the diagram or the text described in one embodiment, in the case where at least one specific example is described, a broader concept of the specific example is disclosed as one embodiment of the invention, and one embodiment of the invention can be constituted. The embodiment of the present invention is clear.

Note that in this specification and the like, what is illustrated in at least a diagram (which may be part of the diagram) is disclosed as one embodiment of the invention, and one embodiment of the invention can be constituted. Therefore, when certain contents are described in a diagram, the contents are disclosed as one embodiment of the invention even when the contents are not described with text, and one embodiment of the invention can be constituted. In a similar manner, part of a diagram, which is taken out from the diagram, is disclosed as one embodiment of the invention, and one embodiment of the invention can be constituted. The embodiment of the present invention is clear.

In this embodiment, one embodiment of the present invention has been described. Other embodiments of the present invention will be described in other embodiments. Note that one embodiment of the present invention is not limited thereto. In other words, various embodiments of the invention are described in this embodiment and the other embodiments, and one embodiment of the present invention is not limited to a particular embodiment. For example, although an example of use in a lithium-ion secondary battery is described in this embodiment, one embodiment of the present invention is not limited thereto. Depending on circumstances or conditions, application of one embodiment of the present invention to a variety of secondary batteries such as a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, and an air battery is also possible. Depending on circumstances or conditions, one embodiment of the present invention is not necessarily applied to a lithium-ion secondary battery, for example.

Embodiment 2

In this embodiment, an example of the configuration described in the above embodiment in which an exterior body of a lithium-ion storage battery is provided with wirings and examples of the wirings and a circuit for detecting a fracture of the lithium-ion storage battery will be described.

Figure 24A:
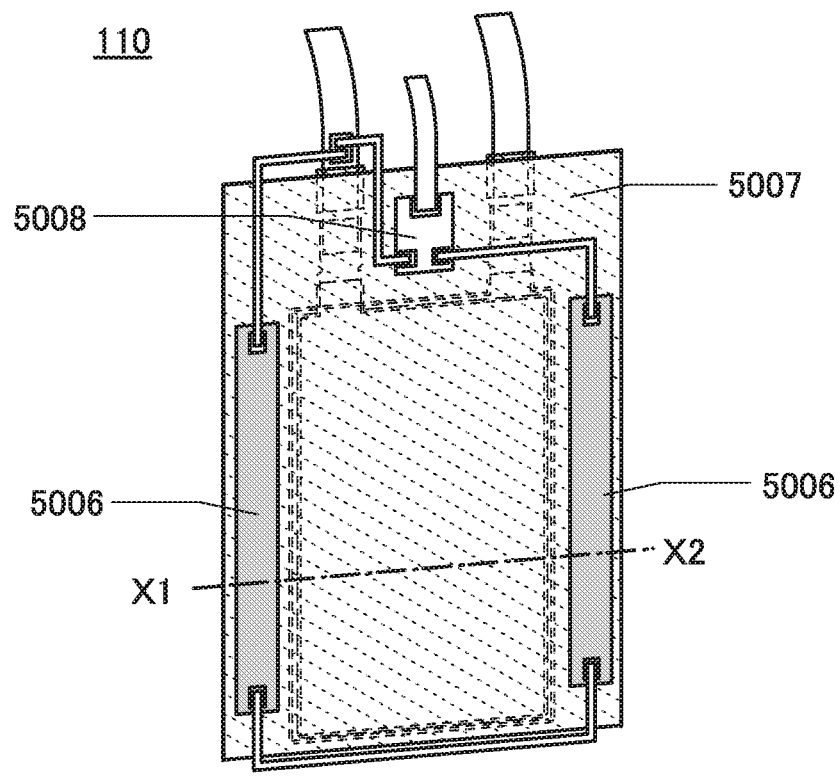
FIGS. 24A and 24B illustrate an appearance and a cross-sectional structure of a storage battery of one embodiment of the present invention.
Figure 24B:
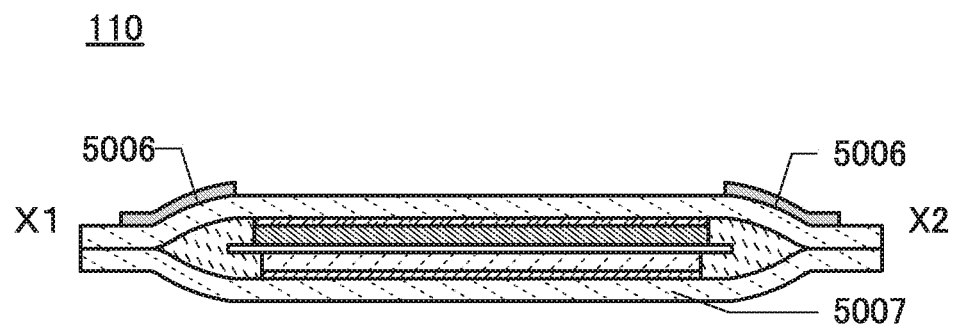

FIG. 24A is a schematic diagram of a laminated storage battery including an exterior body 5007 that is provided with wirings 5006. FIG. 24B is a cross-sectional view along the dashed-dotted line X1-X2 in FIG. 24A. The exterior body 5007 of the lithium-ion storage battery 110 illustrated in FIGS. 24A and 24B is provided with the wirings 5006 along the shape of the exterior body 5007 in order to prevent damage by fatigue due to deformation. The exterior body 5007 is also provided with a circuit 5008 for detecting damage to the wirings 5006, such as a fracture.

The wirings 5006 can be formed using a material that is less resistant to deformation than a material of a component to be protected from being damaged, that is, a material of the exterior body 5007. The wirings 5006 can be provided in the following manner: wirings prepared in advance are attached to the exterior body 5007; or a conductive paste or slurry is applied or printed to have a predetermined shape on the exterior body 5007 and dried. Furthermore, protective films for preventing damage by a cause other than fatigue due to deformation may be provided over the wirings 5006.

As a material of the exterior body 5007, for example, a film having a three-layer structure in which a highly flexible metal thin film of aluminum, stainless steel, copper, nickel, or the like is provided over a film formed of a material such as polyethylene, polypropylene, polycarbonate, ionomor, or polyamide, and an insulating synthetic resin film of a polyamide-based resin, a polyester-based resin, or the like is provided as the outer surface of the exterior body over the metal thin film can be used as described in Embodiment 1. In the case where such a film with a three-layer structure is used as the exterior body, when repeated changes in the form of the exterior body increase fatigue (damage), the metal thin layer might be damaged. Thus, the wirings 5006 should be less resistant to deformation than the metal thin layer.

When the exterior body in the form of a film with a three-layer structure is used, a material that has lower mechanical strength than the metal thin layer can be used to form the wiring 5006 that is more easily breakable than the metal thin layer. A variety of methods to measure mechanical strength are known, and a material whose strength is found to be low by any of the measurement methods is used.

Although the wirings 5006 are provided at two positions in FIG. 24A, for example, the number of the wirings is not limited to two. Terminals of a series of wirings 5006 are electrically connected to the circuit 5008.

Although the circuit 5008 is provided over the exterior body 5007 in FIG. 24A, for example, there is no limitation on the place where the circuit 5008 is provided. The circuit 5008 may be provided inside the lithium-ion storage battery 110, for example. Alternatively, the circuit 5008 may be provided outside the lithium-ion storage battery 110. Alternatively, the circuit 5008 may be provided over the same substrate as a battery management unit BMU of the lithium-ion storage battery 110. Alternatively, the circuit 5008 may be provided in an electronic device that is supplied with power from the lithium-ion storage battery 110. Note that power for driving the circuit 5008 can be directly supplied from the lithium-ion storage battery 110. In that case, the voltage of the lithium-ion storage battery 110 is raised or lowered as needed and supplied.

Figure 25A:
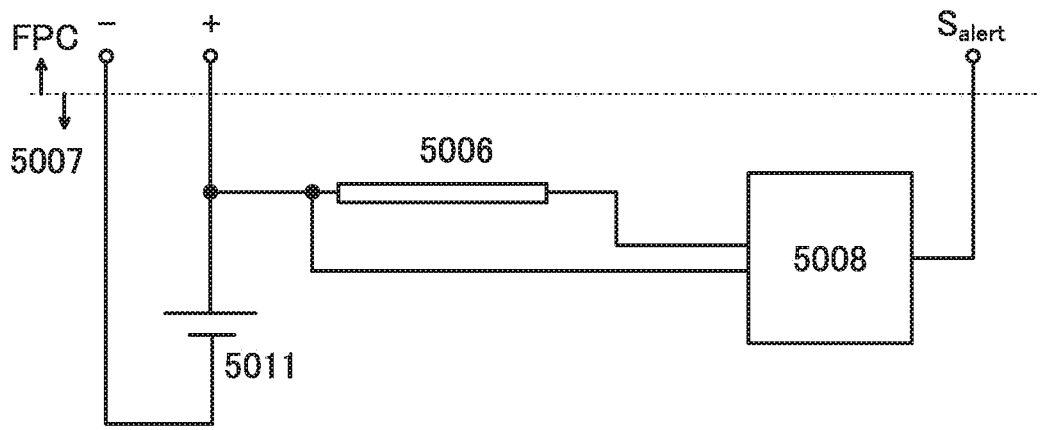
FIGS. 25A and 25B are circuit diagrams each illustrating one embodiment of the present invention.

A circuit diagram in FIG. 25A illustrates the connection between the circuit 5008 and the wiring 5006 in FIGS. 24A and 24B. Note that in FIG. 25A, a battery cell 5011 inside the exterior body 5007, a positive terminal, a negative terminal, and a terminal for outputting a signal for indicating presence or absence of damage such as a fracture are illustrated for explanation. The positive terminal, the negative terminal, and the terminal are provided on the side where an FPC for taking out the signal to the outside is provided, and the circuit 5008 and the wiring 5006 are provided on the exterior body 5007 side.

In FIG. 25A, one terminal of the wiring 5006 is electrically connected to a positive electrode of the battery cell 5011. The other terminal of the wiring 5006 is electrically connected to the positive electrode of the battery cell 5011 through the wiring 5006.

The circuit 5008 is connected to each of the one terminal and the other terminal of the wiring 5006. The circuit 5008 has a function of outputting a signal in accordance with presence or absence of damage to the wiring 5006, such as a fraction. The circuit 5008 can detect a difference in potential between the one terminal and the other terminal of the wiring 5006 and output a signal to the terminal $S_{alert}$, for example.

Figure 25B:
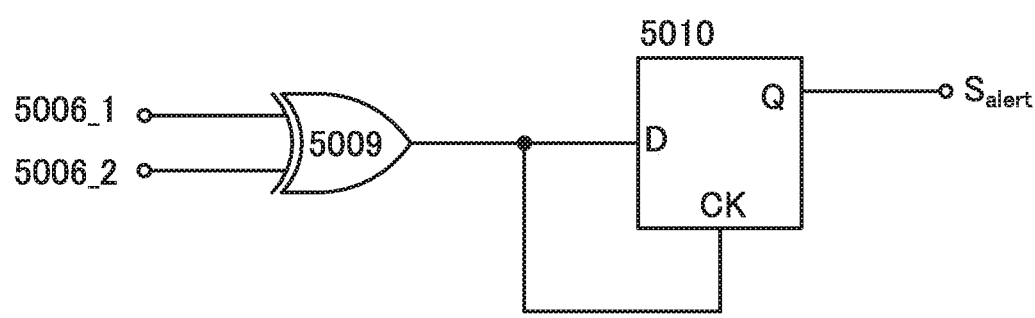

FIG. 25B illustrates the configuration of the circuit 5008. The circuit 5008 includes an exclusive OR circuit 5009 and a D latch 5010. Note that a transistor included in the circuit 5008 can be formed using an oxide semiconductor in a channel formation region, and the CAAC-OS film described above can be used as the oxide semiconductor.

The exclusive OR circuit 5009 is supplied with a potential 5006_1 of the one terminal of the wiring 5006 and a potential 5006_2 of the other terminal of the wiring 5006. An output of the exclusive OR circuit 5009 is supplied to a D terminal and a CK terminal of the D latch 5010. An output of the D latch 5010 is supplied to the terminal $S_{alert}$ from a Q terminal. A signal for indicating presence or absence of damage such as a fracture that is output from the terminal $S_{alert}$ is output to an external circuit.

The circuit 5008 outputs a low-level (low-potential) signal when the wiring 5006 has no damage such as a fracture. The wiring 5006 having no damage such as a fracture has low resistance; thus, the potential 5006_1 and the potential 5006_2 are equal to each other. In this case, the exclusive OR circuit 5009 outputs a low potential, and the low potential is input to the D terminal and the CK terminal of the D latch 5010, and the low potential is output from the Q terminal of the D latch 5010. These are operations in a normal state where the wiring 5006 has no damage such as a fracture.

On the other hand, the circuit 5008 outputs a high-level (high-potential) signal when the wiring 5006 has damage such as a fracture. When the wirings 5006 and the exterior body 5007 are deformed and fatigue (damage) accumulates because of repeated deformation of the lithium-ion storage battery 110, the wiring 5006 is damaged (e.g., fractured) first, increasing electric resistance. Thus, supply of charge from the battery cell 5011 to the other terminal of the wiring 5006 is stopped, so that the potential 5006_2 is decreased by release of charge to the outside. In contrast, there is supply of charge from the battery cell 5011 to the one terminal of the wiring 5006; therefore, the potential 5006_1 can be different from the potential 5006_2. When the potential 5006_1 and the potential 5006_2 are different from each other, the exclusive OR circuit 5009 outputs a high potential, the high potential is input to the D terminal and the CK terminal of the D latch 5010, and the high potential is output from the Q terminal of the D latch 5010. These are operations in a state where the wiring 5006 has damage such as a fracture.

When the wiring 5006 is damaged (e.g., fractured), the circuit 5008 outputs the high potential as a signal to an external circuit, thereby notifying a user of an abnormal state of the wiring 5006 to alert him/her to stop the use of the lithium-ion storage battery 110 and replace it with a new one. Since the use of the lithium-ion storage battery 110 can be stopped before the exterior body 5007 is damaged, an accident due to damage to the exterior body 5007 can be prevented. Note that the signal is generated by the D latch 5010 and thus keeps being output once it is output.

Although the method to detect damage to the wiring with the use of the circuit has been described in this embodiment, a method to detect damage to the wiring is not limited thereto. It is possible to utilize a change in any of a variety of physical properties such as thermal conductivity and volume due to accumulated fatigue of (damage to) the wiring.

In the aforementioned manner, the lithium-ion storage battery of one embodiment of the present invention can prevent an accident of a fracture of a component due to accumulated fatigue (damage) caused by repeated deformation.

This embodiment can be implemented in combination with any of the other embodiments as appropriate.

Embodiment 3

In this embodiment, structures of a storage batteries of embodiments of the present invention will be described with reference to FIGS. 4A to 4C, FIGS. 5A and 5B, and FIGS. 6A and 6B.

<<Coin-Type Storage Battery>>

Figure 4A:
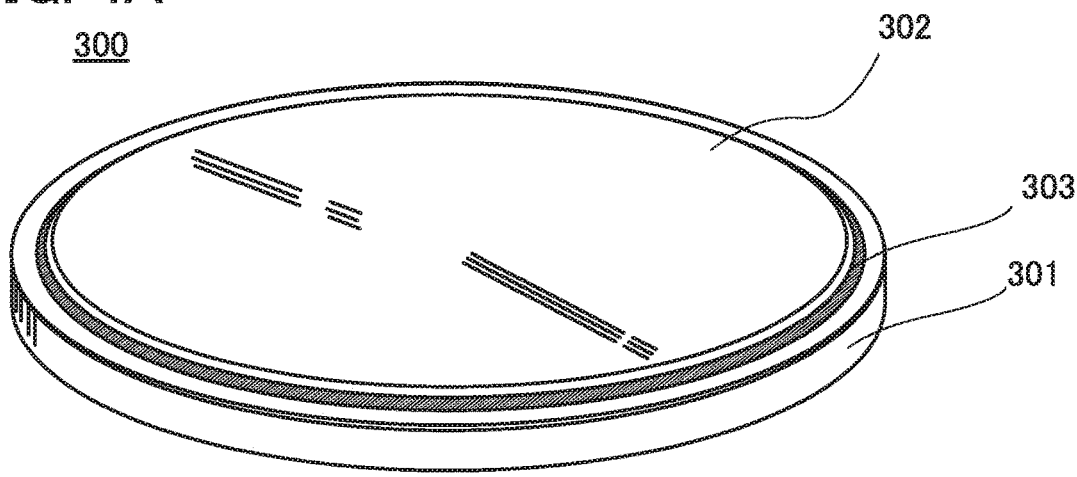
FIGS. 4A to 4C illustrate a coin-type storage battery.
Figure 4B:
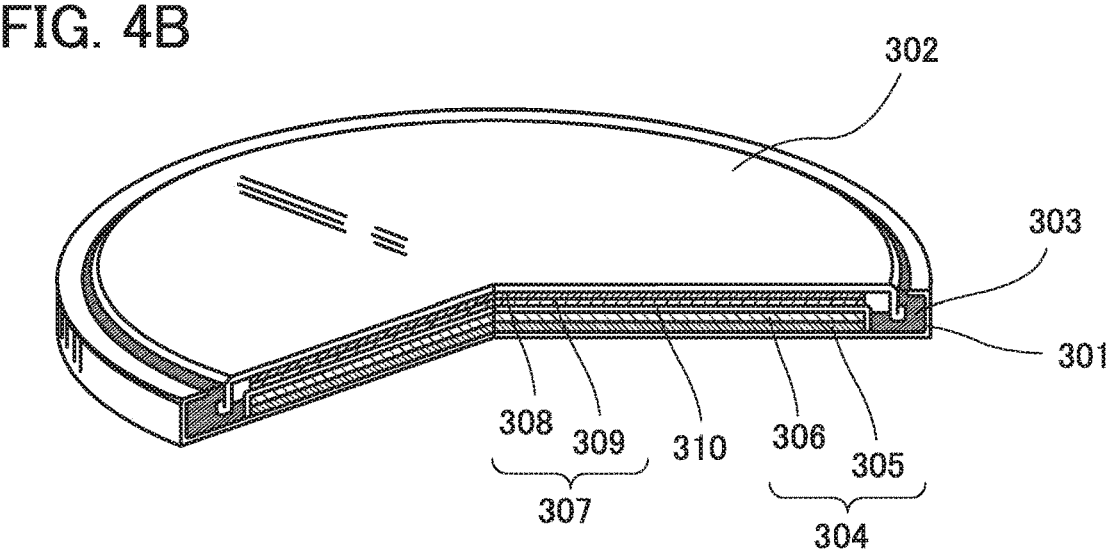

FIG. 4A is an external view of a coin-type (single-layer flat type) storage battery, and FIG. 4B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. The positive electrode active material layer 306 may further include a binder for increasing adhesion of positive electrode active materials, a conductive additive for increasing the conductivity of the positive electrode active material layer, and the like in addition to the active materials.

A negative electrode 307 includes a negative electrode current collector 308 and a negative electrode active material layer 309 provided in contact with the negative electrode current collector 308. The negative electrode active material layer 309 may further include a binder for increasing adhesion of negative electrode active materials, a conductive additive for increasing the conductivity of the negative electrode active material layer, and the like in addition to the negative electrode active materials. A separator 310 and an electrolyte (not illustrated) are provided between the positive electrode active material layer 306 and the negative electrode active material layer 309.

The materials described in Embodiment 1 can be used for the components.

For the positive electrode can 301 and the negative electrode can 302, a metal having a corrosion-resistant property to an electrolytic solution, such as nickel or titanium, an alloy of such a metal, or an alloy of such a metal and another metal (e.g., stainless steel or the like) can be used. Alternatively, the positive electrode can 301 and the negative electrode can 302 are preferably covered with nickel or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 4B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

Here, a current flow in charging a storage battery will be described with reference to FIG. 4C. When a storage battery using lithium is regarded as a closed circuit, lithium ions transfer and a current flows in the same direction. Note that in the storage battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, it should be mentioned that the anode or the cathode is which of the one at the time of charging or the one at the time of discharging and corresponds to which of a positive electrode or a negative electrode.

Figure 4C:
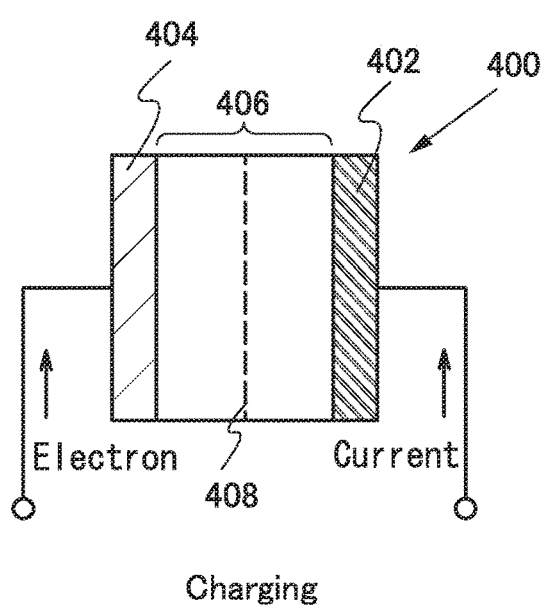

Two terminals in FIG. 4C are connected to a charger, and a storage battery 400 is charged. As the charge of the storage battery 400 proceeds, a potential difference between electrodes increases. In FIG. 4C, the direction in which the current flows from one terminal outside the storage battery 400 to a positive electrode 402, flows from the positive electrode 402 to a negative electrode 404 in the storage battery 400, and flows from the negative electrode 404 to the other terminal outside the storage battery 400 is the positive direction.

<<Cylindrical Storage Battery>>

Figure 5A:
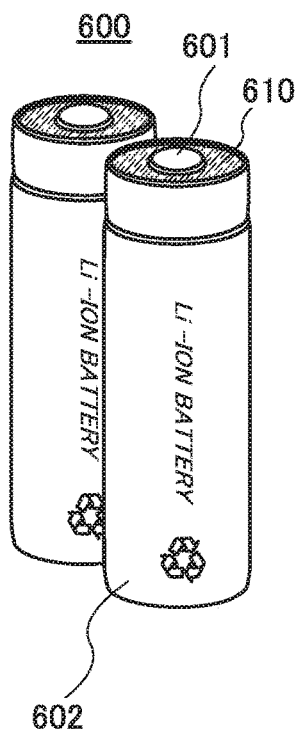
FIGS. 5A and 5B illustrate a cylindrical storage battery.

Next, an example of a cylindrical storage battery will be described with reference to FIGS. 5A and 5B. The cylindrical storage battery 600 includes a positive electrode cap (battery cap) 601 on the upper surface and a battery can (outer can) 602 on the side surface and the lower surface. The positive electrode cap 601 and the battery can 602 are insulated from each other by a gasket (insulating gasket) 610.

Figure 5B:
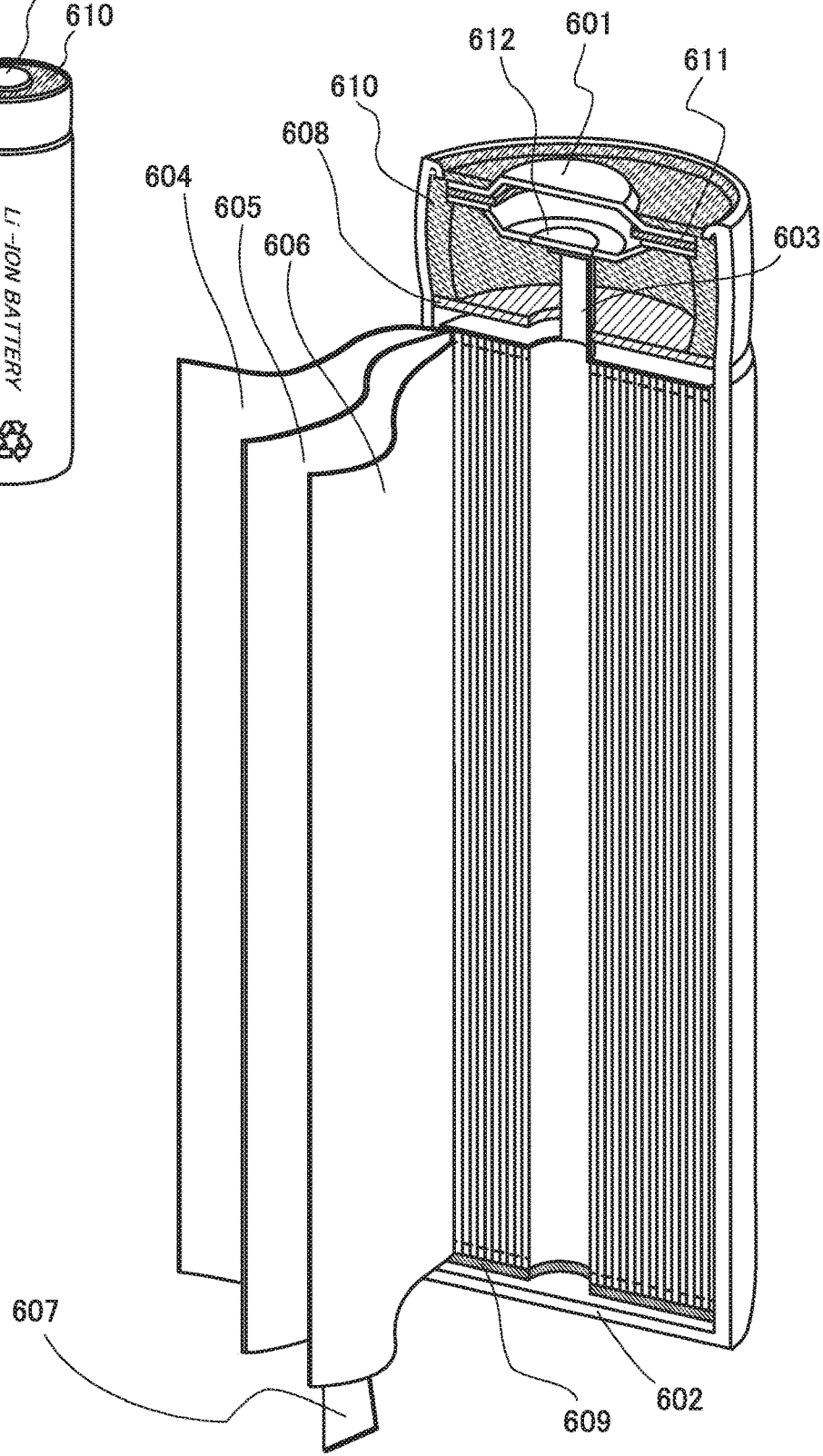

FIG. 5B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. One end of the battery can 602 is close and the other end thereof is open. For the battery can 602, a metal having a corrosion-resistant property to an electrolytic solution, such as nickel or titanium, an alloy of such a metal, or an alloy of such a metal and another metal (e.g., stainless steel or the like) can be used. Alternatively, the battery can 602 is preferably covered with nickel or the like in order to prevent corrosion due to the electrolytic solution. Inside the battery can 602, the battery element in which the positive electrode, the negative electrode, and the separator are wound is provided between a pair of insulating plates 608 and 609 that face each other. Furthermore, a nonaqueous electrolytic solution (not illustrated) is injected inside the battery can 602 provided with the battery element. As the nonaqueous electrolytic solution, a nonaqueous electrolytic solution that is similar to that of the coin-type storage battery can be used.

Although the positive electrode 604 and the negative electrode 606 can be formed in a manner similar to that of the positive electrode and the negative electrode of the coin-type storage battery described above, the difference lies in that, since the positive electrode and the negative electrode of the cylindrical storage battery are wound, active materials are formed on both sides of the current collectors. A positive electrode terminal (positive electrode current collecting tab) 603 is connected to the positive electrode 604, and a negative electrode terminal (negative electrode current collecting tab) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic can be used for the PTC element.

<<Laminated Storage Battery>>

Next, an example of a laminated storage battery will be described with reference to FIG. 6A. When a flexible laminated storage battery is used in an electronic device at least part of which is flexible, the storage battery can be bent as the electronic device is bent.

Figure 6A:
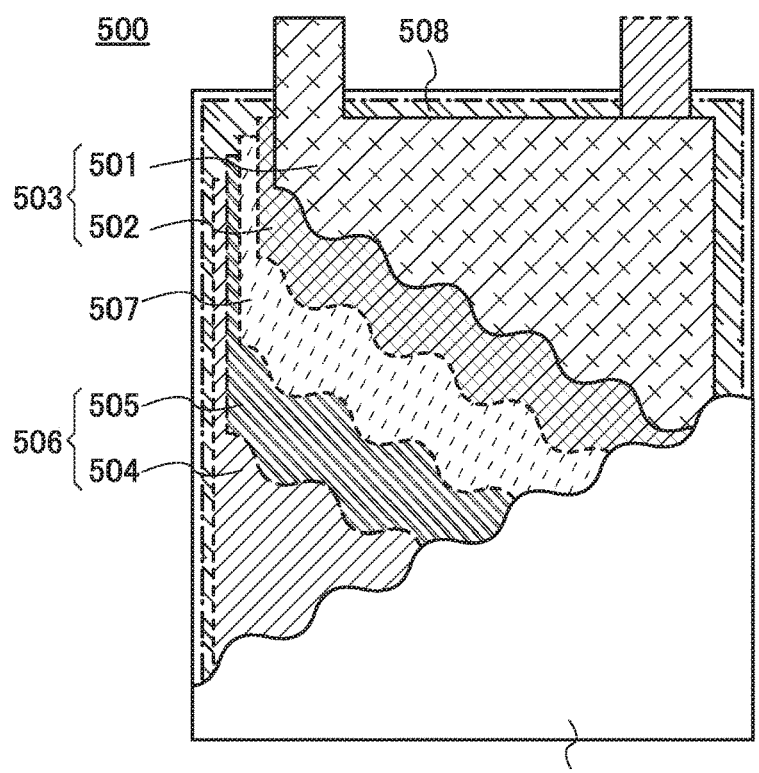
FIGS. 6A and 6B illustrate a laminated storage battery.

A laminated storage battery 500 illustrated in FIG. 6A includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the exterior body 509. The electrolytic solution 508 is included in the exterior body 509. The electrolytic solution described in Embodiment 1 can be used as the electrolytic solution 508.

In the laminated storage battery 500 illustrated in FIG. 6A, the positive electrode current collector 501 and the negative electrode current collector 504 also serve as terminals for an electrical contact with an external portion. For this reason, each of the positive electrode current collector 501 and the negative electrode current collector 504 may be arranged so that part of the positive electrode current collector 501 and part of the negative electrode current collector 504 are exposed to the outside of the exterior body 509. Alternatively, a tab electrode and the positive electrode current collector 501 or the negative electrode current collector 504 may be bonded to each other by ultrasonic welding, and instead of the positive electrode current collector 501 and the negative electrode current collector 504, the tab electrode may be exposed to the outside of the exterior body 509.

As the exterior body 509 in the laminated storage battery 500, for example, a laminate film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

Figure 6B:
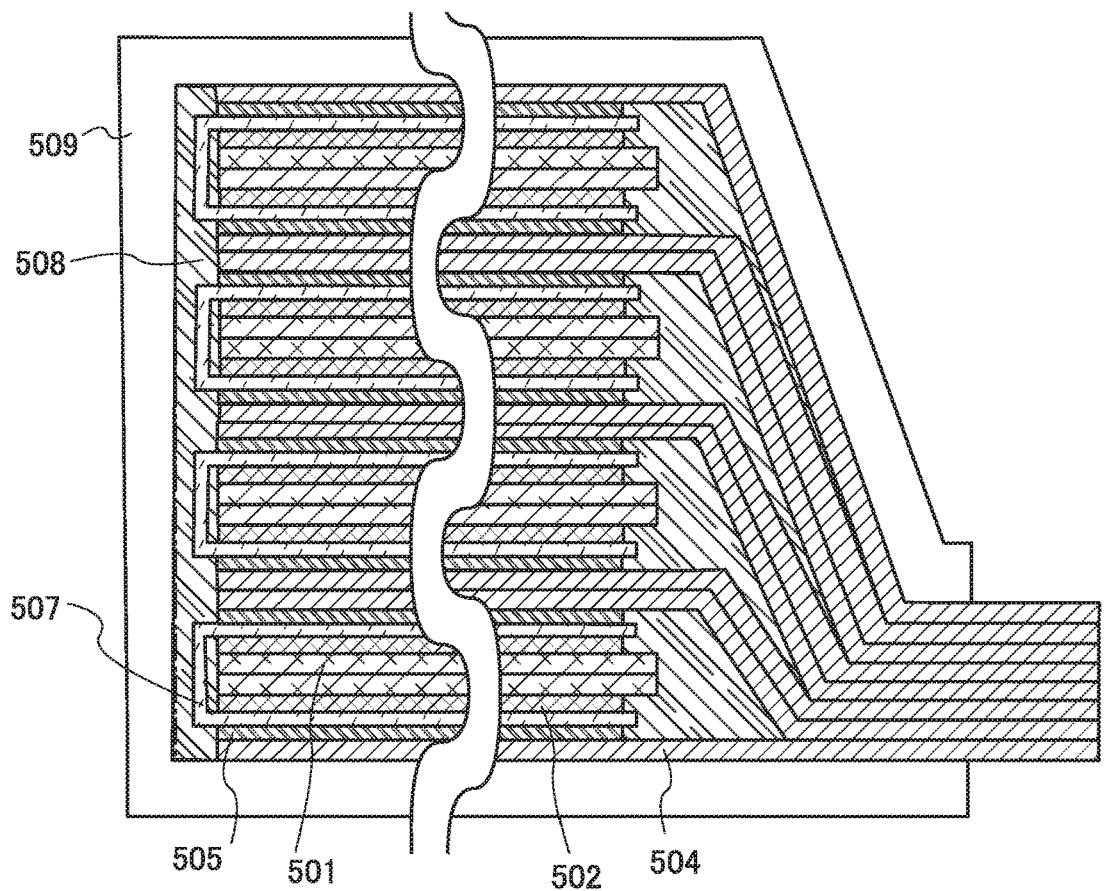

FIG. 6B illustrates an example of a cross-sectional structure of the laminated storage battery 500. Although FIG. 6A illustrates an example of including only two current collectors for simplicity, the actual battery includes a plurality of electrode layers.

Figure 8:
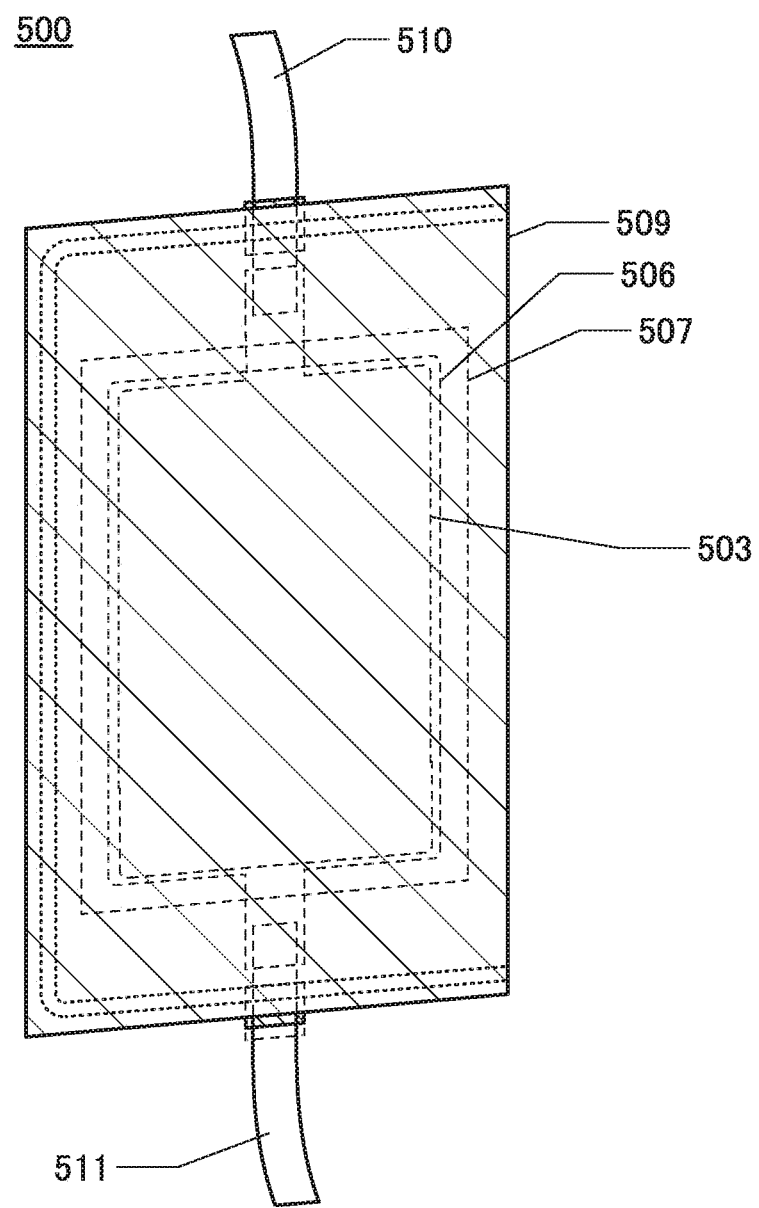
FIG. 8 illustrates an appearance of a storage battery.

The example in FIG. 6B includes 16 electrode layers. The laminated storage battery 500 has flexibility even though including 16 electrode layers. In FIG. 6B, 8 negative electrode current collectors 504 and 8 positive electrode current collectors 501 are included. Note that FIG. 6B illustrates a crass section of a lead portion of the negative electrode, and 8 negative electrode current collectors 504 are bonded to each other by ultrasonic welding. It is needless to say that the number of electrode layers is not limited to 16, and may be more than 16 or less than 16. In the case of using a large number of electrode layers, the storage battery can have high capacity. In contrast, in the case of using a small number of electrode layers, the storage battery can have a small thickness and high flexibility.

FIGS. 7 and 8 each illustrate an example of the external view of the laminated storage battery 500. In FIGS. 7 and 8, the positive electrode 503, the negative electrode 506, the separator 507, the exterior body 509. a positive electrode tab electrode 510, and a negative electrode tab electrode 511 are included.

Figure 9A:
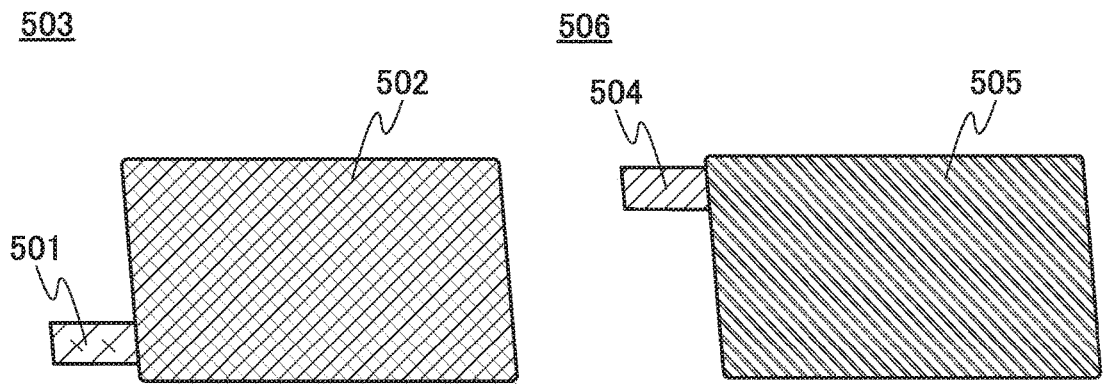
FIGS. 9A to 9C illustrate a method for fabricating a storage battery.

FIG. 9A illustrates the external views of the positive electrode 503 and the negative electrode 506. The positive electrode 503 includes the positive electrode current collector 501, and the positive electrode active material layer 502 is formed over a surface of the positive electrode current collector 501. The positive electrode 503 also includes a region where the positive electrode current collector 501 is partly exposed (referred to as a tab region). The negative electrode 506 includes the negative electrode current collector 504, and the negative electrode active material layer 505 is formed over a surface of the negative electrode current collector 504. The negative electrode 506 also includes a region where the negative electrode current collector 504 is partly exposed, that is, a tab region. The areas and shapes of the tab regions included in the positive electrode and negative electrode are not limited to those illustrated in FIG. 9A.

<<Method for Fabricating Laminated Storage Battery>>

Figure 9B:
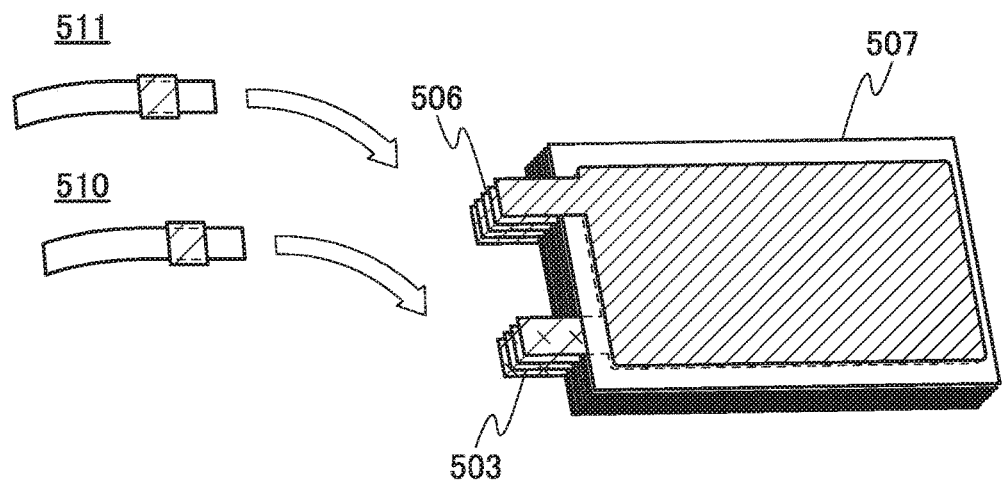

Here, an example of a method for fabricating the laminated storage battery whose external view is illustrated in FIG. 7 will be described with reference to FIGS. 9B and 9C.

First, the negative electrode 506, the separator 507, and the positive electrode 503 are stacked. FIG. 9B illustrates a stack including the negative electrode 506, the separator 507, and the positive electrode 503. The battery described here as an example includes 5 negative electrodes and 4 positive electrodes. Next, the tab regions of the positive electrodes 503 are bonded to each other, and the tab region of the positive electrode of the outermost surface and the positive electrode tab electrode 510 are bonded to each other. The bonding can be performed by ultrasonic welding, for example. In a similar manner, the tab regions of the negative electrodes 506 are bonded to each other, and the tab region of the negative electrode of the outermost surface and the negative electrode tab electrode 511 are bonded to each other.

After that, the negative electrode 506, the separator 507, and the positive electrode 503 are placed over the exterior body 509.

Figure 9C:
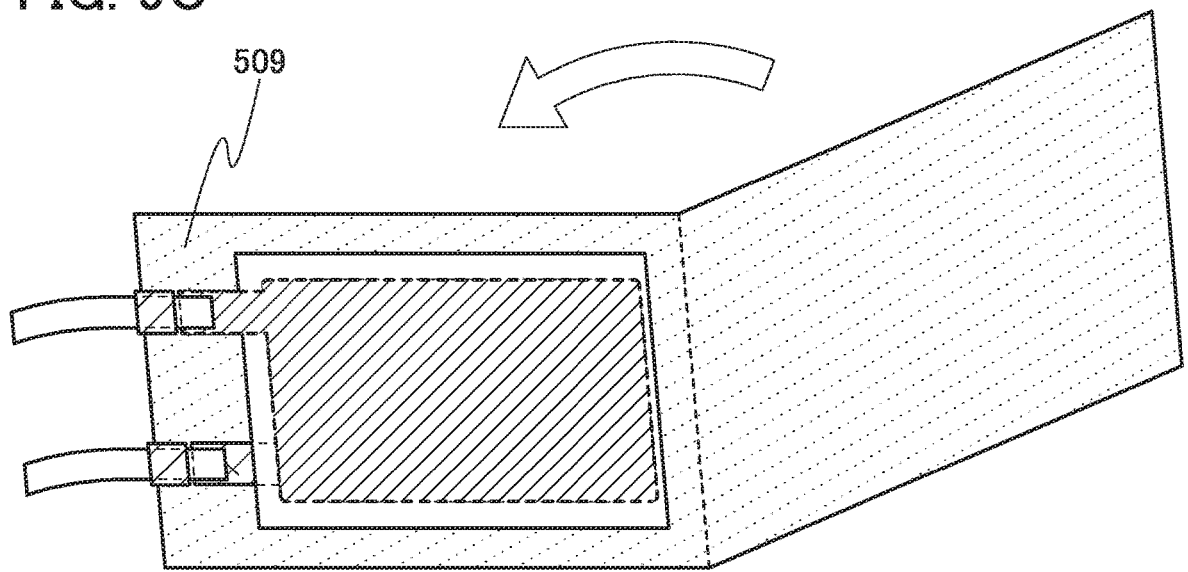

Subsequently, the exterior body 509 is folded along a dashed line as illustrated in FIG. 9C. Then, the outer edge of the exterior body 509 is bonded. The bonding can be performed by thermocompression, for example. At this time, a part (or one side) of the exterior body 509 is left unbonded (to provide an inlet) so that the electrolytic solution 508 can be introduced later.

Next, the electrolytic solution 508 is introduced into the exterior body 509 from the inlet of the exterior body 509. The electrolytic solution 508 is preferably introduced in a reduced pressure atmosphere or in an inert gas atmosphere. Lastly, the inlet is bonded. In the above manner, the laminated storage battery 500 can be fabricated.

Note that in this embodiment, the coin-type storage battery, the laminated storage battery, and the cylindrical storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or wound may be employed.

FIGS. 10A to 10E illustrate examples of electronic devices including flexible laminated storage batteries. Examples of electronic devices each including a flexible storage battery include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, a flexible storage battery can be incorporated along a curved inside/outside wall surface of a house or a building or a curved interior/exterior surface of a car.

FIG. 10A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a storage battery 7407.

FIG. 10B illustrates the mobile phone 7400 that is bent. When the whole mobile phone 7400 is bent by the external force, the storage battery 7407 included in the mobile phone 7400 is also bent. FIG. 10C illustrates the bent storage battery 7407. The storage battery 7407 is a laminated storage battery.

FIG. 10D illustrates an example of a bangle display device. A portable display device 7100 includes a housing 7101, a display portion 7102, an operation button 7103, and a storage battery 7104. FIG. 10E illustrates the bent storage battery 7104.

<<Structural Examples of Storage Batteries>>

Structural examples of storage batteries will be described with reference to FIGS. 11A and 11B, FIGS. 12A1 to 12B2, FIGS. 13A and 13B, FIGS. 14A and 14B, and FIG. 15.

Figure 11A:
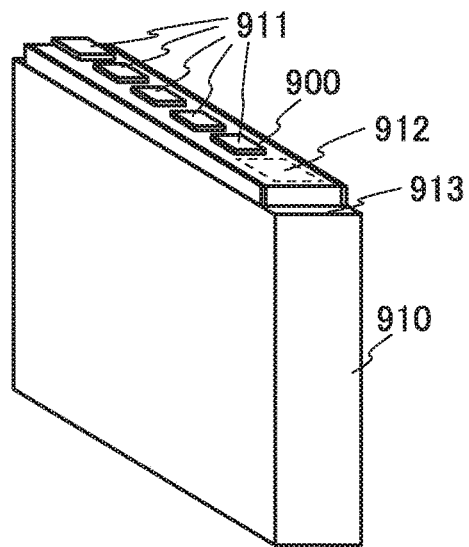
FIGS. 11A and 11B illustrate an example of a storage battery.
Figure 11B:
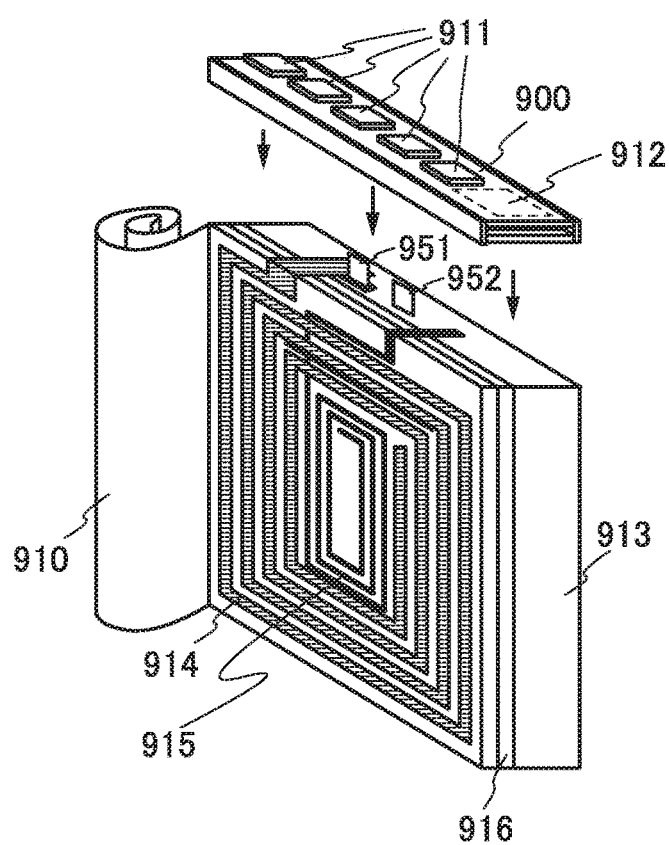

FIGS. 11A and 11B are external views of a storage battery. The storage battery includes a circuit board 900 and a storage battery 913. A label 910 is attached to the storage battery 913. As shown in FIG. 11B, the storage battery further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The storage battery includes a layer 916 between the storage battery 913 and the antennas 914 and 915. The layer 916 may have a function of preventing an adverse effect on an electromagnetic field by the storage battery 913. As the layer 916, for example, a magnetic body can be used.

Note that the structure of the storage battery is not limited to that shown in FIGS. 11A and 11B.

For example, as shown in FIGS. 12A1 and 12A2, two opposite surfaces of the storage battery 913 in FIGS. 11A and 11B may be provided with respective antennas. FIG. 12A1 is an external view showing one side of the opposite surfaces, and FIG. 12A2 is an external view showing the other side of the opposite surfaces. For portions similar to those in FIGS. 11A and 11B, a description of the storage battery illustrated in FIGS. 11A and 11B can be referred to as appropriate.

As illustrated in FIG. 12A1, the antenna 914 is provided on one of the opposite surfaces of the storage battery 913 with the layer 916 interposed therebetween, and as illustrated in FIG. 12A2, the antenna 915 is provided on the other of the opposite surfaces of the storage battery 913 with a layer 917 interposed therebetween. The layer 917 may have a function of preventing an adverse effect on an electromagnetic field by the storage battery 913. As the layer 917, for example, a magnetic body can be used.

With the above structure, both of the antennas 914 and 915 can be increased in size.

Alternatively, as illustrated in FIGS. 12B1 and 12B2, two opposite surfaces of the storage battery 913 in FIGS. 11A and 11B may be provided with different types of antennas. FIG. 12B1 is an external view showing one side of the opposite surfaces, and FIG. 12B2 is an external view showing the other side of the opposite surfaces. For portions similar to those in FIGS. 11A and 11B, a description of the storage battery illustrated in FIGS. 11A and 11B can be referred to as appropriate.

As illustrated in FIG. 12B1, the antenna 914 is provided on one of the opposite surfaces of the storage battery 913 with the layer 916 interposed therebetween, and as illustrated in FIG. 12B2, an antenna 918 is provided on the other of the opposite surfaces of the storage battery 913 with the layer 917 interposed therebetween. The antenna 918 has a function of communicating data with an external device, for example. An antenna with a shape that can be applied to the antennas 914 and 915, for example, can be used as the antenna 918. As a system for communication using the antenna 918 between the storage battery and another device, a response method that can be used between the storage battery and another device, such as NFC, can be employed.

Figure 13A:
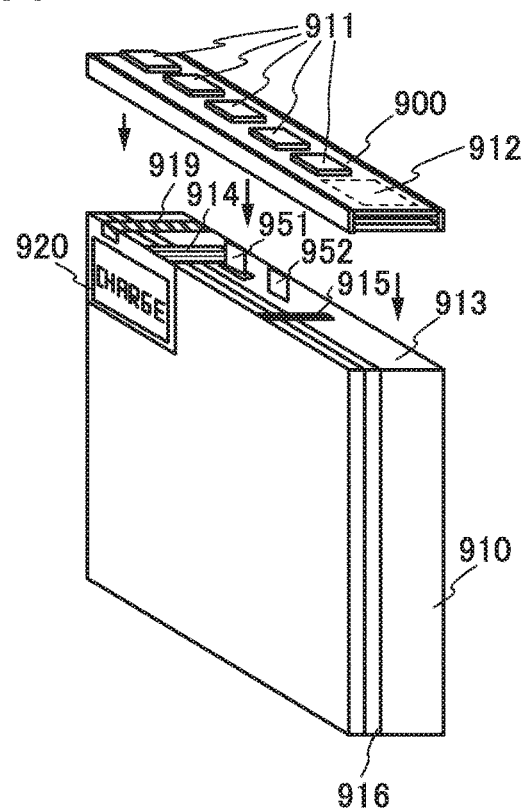
FIGS. 13A and 13B each illustrate an example of a storage battery.

Alternatively, as illustrated in FIG. 13A, the storage battery 913 in FIGS. 11A and 11B may be provided with a display device 920. The display device 920 is electrically connected to the terminal 911 via a terminal 919. It is possible that the label 910 is not provided in a portion where the display device 920 is provided. For portions similar to those in FIGS. 11A and 11B, a description of the storage battery illustrated in FIGS. 11A and 11B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 13B:
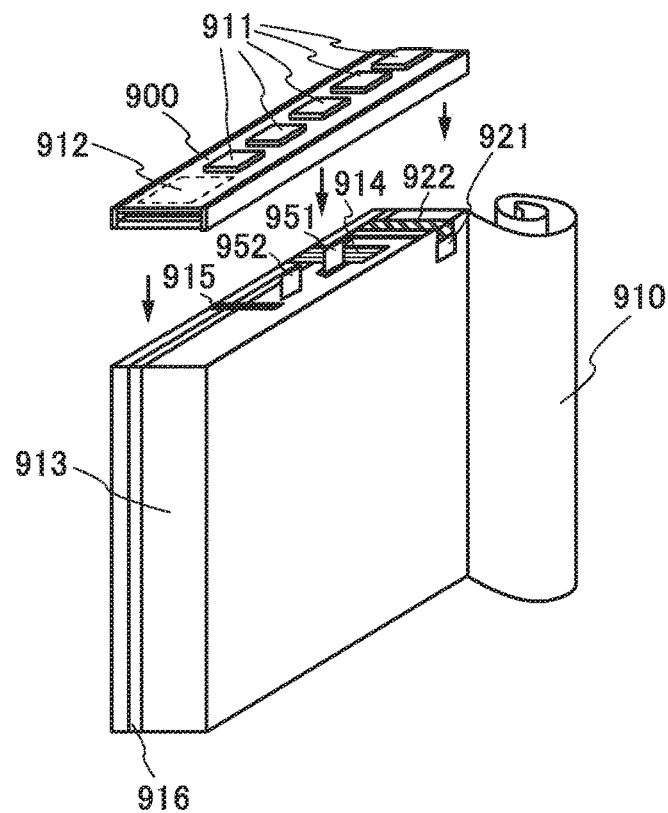

Alternatively, as illustrated in FIG. 13B, the storage battery 913 illustrated in FIGS. 11A and 11B may be provided with a sensor 921. The sensor 921 is electrically connected to the terminal 911 via a terminal 922. For portions similar to those in FIGS. 11A and 11B, a description of the storage battery illustrated in FIGS. 11A and 11B can be referred to as appropriate.

The sensor 921 has a function of measuring, for example, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays. With the sensor 921, for example, data on an environment (e.g., temperature) where the storage battery is placed can be determined and stored in a memory inside the circuit 912.

Furthermore, structural examples of the storage battery 913 will be described with reference to FIGS. 14A and 14B and FIG. 15.

Figure 14A:
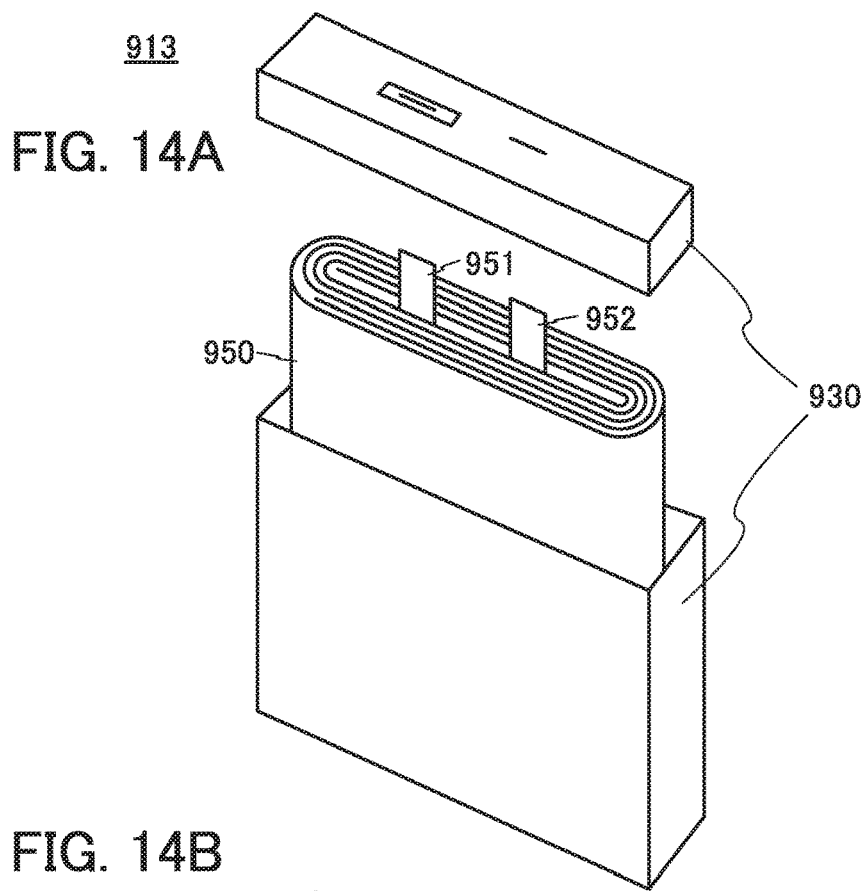
FIGS. 14A and 14B each illustrate an example of a storage battery.

The storage battery 913 illustrated in FIG. 14A includes a wound body 950 provided with the terminals 951 and 952 inside a housing 930. The wound body 950 is soaked in an electrolytic solution inside the housing 930. The terminal 952 is in contact with the housing 930. An insulator or the like prevents contact between the terminal 951 and the housing 930. Note that in FIG. 14A, the housing 930 divided into two pieces is illustrated for convenience; however, in the actual structure, the wound body 950 is covered with the housing 930 and the terminals 951 and 952 extend to the outside of the housing 930. For the housing 930, a metal material or a resin material can be used.

Figure 14B:
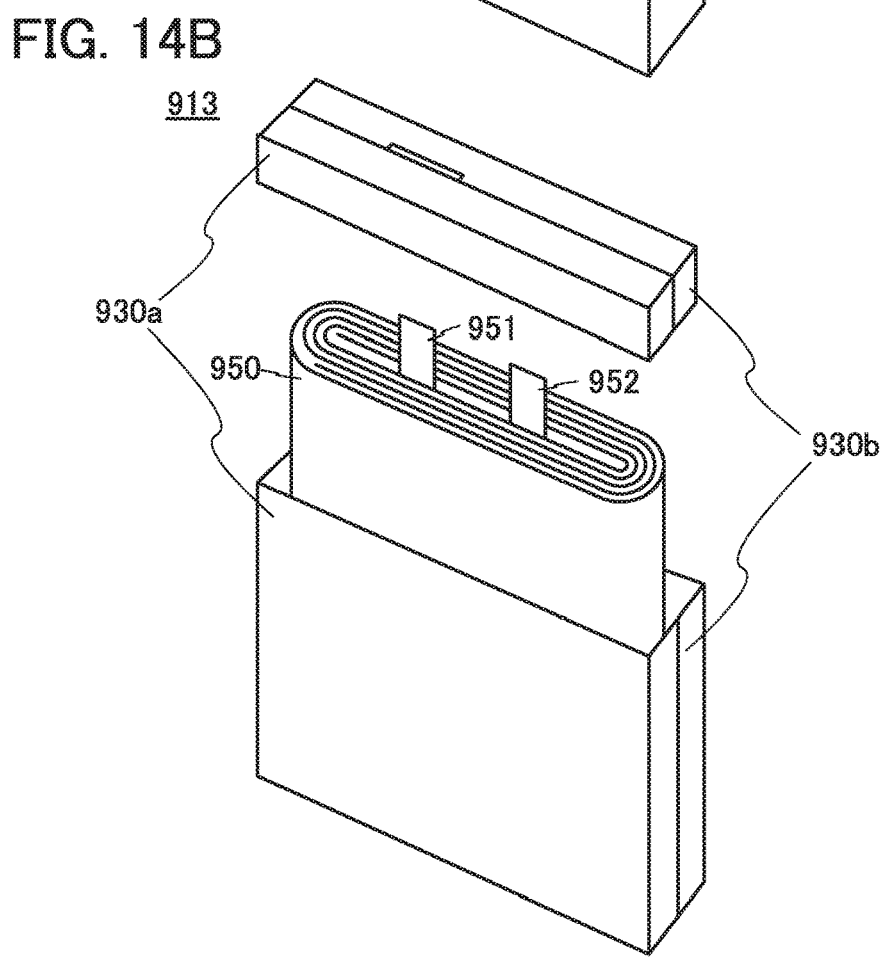

Note that as illustrated in FIG. 14B, the housing 930 in FIG. 14A may be formed using a plurality of materials. For example, in the storage battery 913 in FIG. 14B, a housing 930a and a housing 930b are bonded to each other and the wound body 950 is provided in a region surrounded by the housing 930a and the housing 930b.

For the housing 930a, an insulating material such as an organic resin can be used. In particular, when a material such as an organic resin is used for the side on which an antenna is formed, blocking of an electric field by the storage battery 913 can be prevented. When an electric field is not significantly blocked by the housing 930a, an antenna such as the antennas 914 and 915 may be provided inside the housing 930a. For the housing 930b, a metal material can be used, for example.

Figure 15:
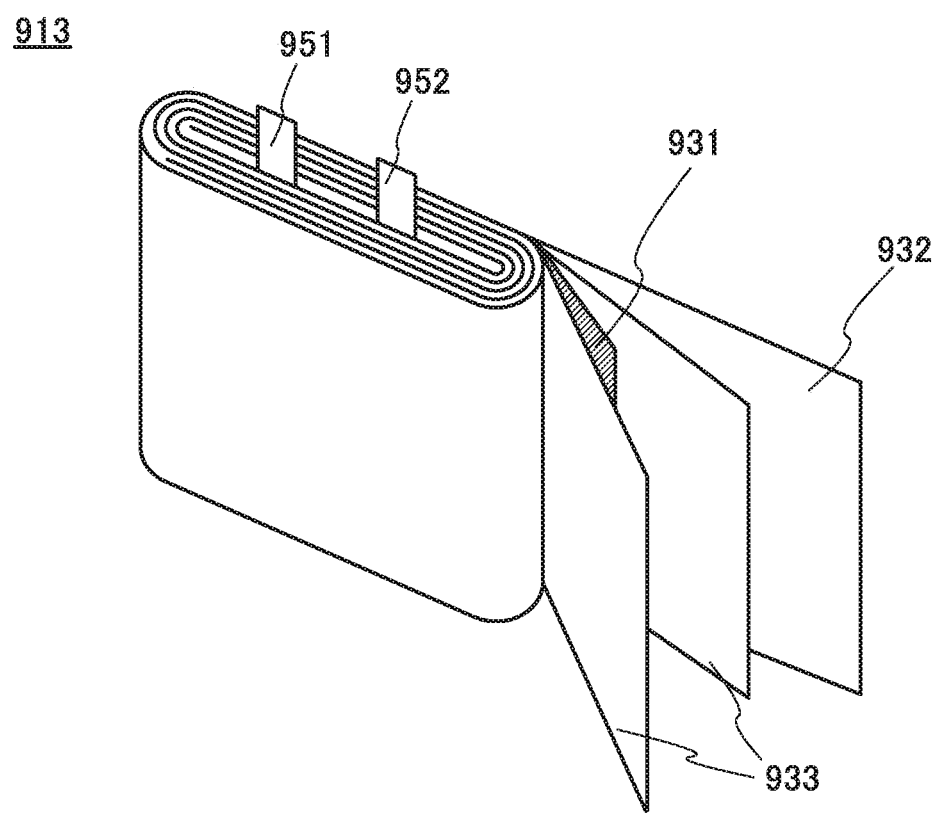
FIG. 15 illustrates an example of a storage battery.

FIG. 15 illustrates the structure of the wound body 950. The wound body 950 includes a negative electrode 931, a positive electrode 932, and a separator 933. The wound body 950 is obtained by winding a sheet of a stack in which the negative electrode 931 overlaps with the positive electrode 932 with the separator 933 provided therebetween. Note that a plurality of stacks of the negative electrode 931, the positive electrode 932, and the separator 933 may be stacked.

The negative electrode 931 is connected to the terminal 911 in FIGS. 11A and 11B via one of the terminals 951 and 952. The positive electrode 932 is connected to the terminal 911 in FIGS. 11A and 11B via the other of the terminals 951 and 952.

<<Examples of Electronic Devices: Vehicles>>

Next, examples where a storage battery is used in a vehicle will be described. The use of storage batteries in vehicles enables production of next-generation clean energy vehicles such as hybrid electric vehicles (HEVs), electric vehicles (EVs), and plug-in hybrid electric vehicles (PHEVs).

Figure 16A:
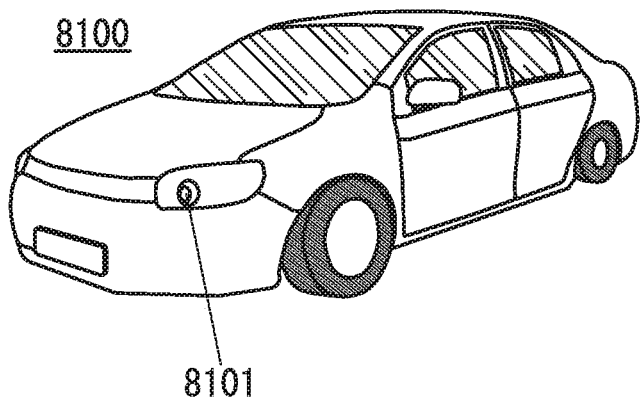
FIGS. 16A and 16B each illustrate an application mode of a storage battery
Figure 16B:
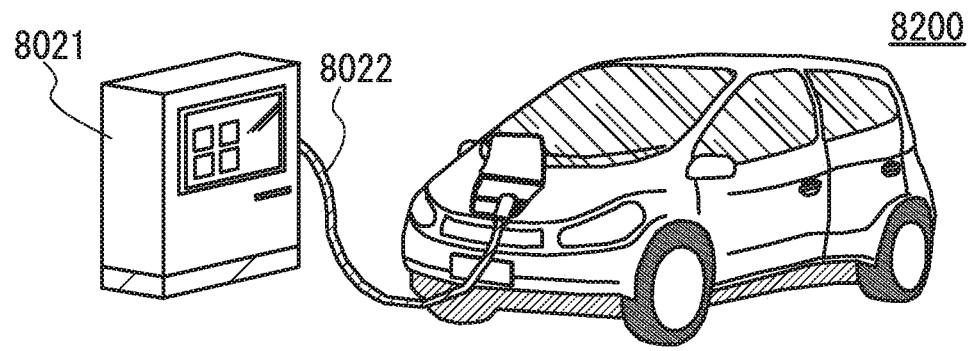

FIGS. 16A and 16B each illustrate an example of a vehicle using one embodiment of the present invention. An automobile 8100 illustrated in FIG. 16A is an electric vehicle that runs on the power of an electric motor. Alternatively, the automobile 8100 is a hybrid electric vehicle capable of driving appropriately using either the electric motor or the engine. One embodiment of the present invention can provide a high-mileage vehicle. The automobile 8100 includes the storage battery. The storage battery is used not only for driving the electric motor, but also for supplying electric power to a light-emitting device such as a headlight 8101 or a room light (not illustrated).

The storage battery can also supply electric power to a display device of a speedometer, a tachometer, or the like included in the automobile 8100. Furthermore, the storage battery can supply electric power to a semiconductor device included in the automobile 8100, such as a navigation system.

FIG. 16B illustrates an automobile 8200 including the storage battery. The automobile 8200 can be charged when the storage battery is supplied with electric power through external charging equipment by a plug-in system, a contactless power feeding system, or the like. In FIG. 16B, a storage battery included in the automobile 8200 is charged with the use of a ground-based charging apparatus 8021 through a cable 8022. In charging, a given method may be employed as a charging method, the standard of a connector, or the like as appropriate. The ground-based charging apparatus 8021 may be a charging station provided in a commerce facility or a power source in a house. For example, with the use of a plug-in technique, the storage battery included in the automobile 8200 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the storage battery when the automobile stops or moves. To supply electric power in such a contactless manner, an electromagnetic induction method or a magnetic resonance method can be used.

According to one embodiment of the present invention, the storage battery can have improved cycle characteristics and reliability. Furthermore, according to one embodiment of the present invention, the storage battery itself can be made more compact and lightweight as a result of improved characteristics of the storage battery. The compact and lightweight storage battery contributes to a reduction in the weight of a vehicle, and thus increases the driving distance. Furthermore, the storage battery included in the vehicle can be used as a power source for supplying electric power to products other than the vehicle. In such a case, the use of a commercial power source can be avoided at peak time of electric power demand.

This embodiment can be implemented in combination with any of the other embodiments as appropriate.

Embodiment 4

A battery management unit (BMU) that can be used in combination with the storage batteries described in Embodiments 1 to 3 as battery cells and transistors that are suitable for a circuit included in the battery management unit will be described with reference to FIG. 17, FIGS. 18A to 18C, FIG. 19, FIG. 20, FIGS. 21A to 21C, FIG. 22, and FIG. 23. In this embodiment, in particular, a battery management unit of a storage battery including battery cells connected in series will be described.

When the plurality of battery cells connected in series are repeatedly charged and discharged, there occur variations in charge and discharge characteristics among the battery cells, which causes variations in capacity (output voltage) among the battery cells. The discharge capacity of all the plurality of battery cells connected in series depends on the capacity of the battery cell that is low. The variations in capacity among the battery cells reduce the discharge capacity of all the battery cells. Furthermore, when charge is performed based on the capacity of the battery cell that is low, the battery cells might be undercharged. In contrast, when charge is performed based on the capacity of the battery cell that is high, the battery cells might be overcharged.

Thus, the battery management unit of the storage battery including the battery cells connected in series has a function of reducing variations in capacity among the battery cells, which cause an undercharge and an overcharge. Examples of a circuit configuration for reducing variations in capacity among battery cells include a resistive type, a capacitive type, and an inductive type, and a circuit configuration that can reduce variations in capacity among battery cells using transistors with a low off-state current will be explained here as an example.

A transistor including an oxide semiconductor in its channel formation region (an OS transistor) is preferably used as the transistor with a low off-state current. When an OS transistor with a low off-state current is used in the circuit of the battery management unit of the storage battery, the amount of charge that leaks from a battery can be reduced, and reduction in capacity with the lapse of time can be suppressed.

As the oxide semiconductor used in the channel formation region, an In-M-Zn oxide (M is Ga, Sn, Y, Zr, La, Ce, or Nd) is used. In the case where the atomic ratio of the metal elements of a target for forming an oxide semiconductor film is In:M:Zn=$x_1$:$y_1$:$z_1$, $x_1/y_1$ is preferably greater than or equal to $\frac{1}{3}$ and less than or equal to 6, more preferably greater than or equal to 1 and less than or equal to 6, and $z_1/y_1$ is preferably greater than or equal to $\frac{1}{3}$ and less than or equal to 6, more preferably greater than or equal to 1 and less than or equal to 6. Note that when $z_1/y_1$ is greater than or equal to 1 and less than or equal to 6, a CAAC-OS film as the oxide semiconductor film is easily formed.

Here, the details of the CAAC-OS film will be described.

A CAAC-OS film is one of oxide semiconductor films having a plurality of c-axis aligned crystal parts.

In a combined analysis image (also referred to as a high-resolution TEM image) of a bright-field image and a diffraction pattern of a CAAC-OS film, which is obtained using a transmission electron microscope (TEM), a plurality of crystal parts can be observed. However, in the high-resolution TEM image, a boundary between crystal parts, that is, a grain boundary is not clearly observed. Thus, in the CAAC-OS film, a reduction in electron mobility due to the grain boundary is less likely to occur.

According to the high-resolution cross-sectional TEM image of the CAAC-OS film observed in the direction substantially parallel to the sample surface, metal atoms are arranged in a layered manner in the crystal parts. Each metal atom layer reflects unevenness of a surface over which the CAAC-OS film is formed (hereinafter, a surface over which the CAAC-OS film is formed is referred to as a formation surface) or the top surface of the CAAC-OS film, and is arranged parallel to the formation surface or the top surface of the CAAC-OS film.

On the other hand, according to the plan high-resolution TEM image of the CAAC-OS film observed in the direction substantially perpendicular to the sample surface, metal atoms are arranged in a triangular or hexagonal arrangement in the crystal parts. However, there is no regularity of arrangement of metal atoms between different crystal parts.

For example, when the structure of a CAAC-OS including an $InGaZnO_4$ crystal is analyzed by an out-of-plane method using an X-ray diffraction (XRD) apparatus, a peak may appear at a diffraction angle (2 θ) of around 31°. This peak is derived from the (009) plane of the $InGaZnO_4$ crystal, which indicates that crystals in the CAAC-OS film have c-axis alignment, and that the c-axes are aligned in the direction substantially perpendicular to the formation surface or the top surface of the CAAC-OS film.

Note that in analysis of the CAAC-OS film by an out-of-plane method, another peak may appear when 2 θ is around 36°, in addition to the peak at 2 θ of around 31°. The peak at 2 θ of around 36° indicates that a crystal having no c-axis alignment is included in part of the CAAC-OS film. It is preferable that in the CAAC-OS film, a peak appear when 2 θ is around 31° and that a peak not appear when 2 θ is around 36°.

The CAAC-OS film is an oxide semiconductor film with low impurity concentration. The impurity is an element other than the main components of the oxide semiconductor film, such as hydrogen, carbon, silicon, or a transition metal element. In particular, an element (specifically, silicon or the like) having higher strength of bonding to oxygen than a metal element included in an oxide semiconductor film extracts oxygen from the oxide semiconductor film, which results in disorder of the atomic arrangement and reduced crystallinity of the oxide semiconductor film. Furthermore, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor might serve as a carrier trap or a carrier generation source.

The CAAC-OS film is an oxide semiconductor having a low density of defect states. In some cases, oxygen vacancies in the oxide semiconductor film serve as carrier traps or serve as carrier generation sources when hydrogen is captured therein, for example.

The state in which impurity concentration is low and density of defect states is low (the number of oxygen vacancies is small) is referred to as a "highly purified intrinsic" or "substantially intrinsic" state. A highly purified intrinsic or substantially intrinsic oxide semiconductor has few carrier generation sources, and thus can have a low carrier density. Therefore, a transistor including the oxide semiconductor film rarely has negative threshold voltage (is rarely normally on). The highly purified intrinsic or substantially intrinsic oxide semiconductor film has few carrier traps. Accordingly, the transistor including the oxide semiconductor film has little variation in electrical characteristics and high reliability. Charge trapped by the carrier traps in the oxide semiconductor film takes a long time to be released and might behave like fixed charge. Thus, the transistor including the oxide semiconductor film having high impurity concentration and a high density of defect states has unstable electrical characteristics in some cases.

With the use of the CAAC-OS film in a transistor, variation in the electrical characteristics of the transistor due to irradiation with visible light or ultraviolet light is small.

Since the OS transistor has a wider band gap than a transistor including silicon in its channel formation region (a Si transistor), dielectric breakdown is unlikely to occur when a high voltage is applied. Although a voltage of several hundreds of volts is generated when battery cells are connected in series, the above-described OS transistor is suitable for a circuit of a battery management unit which is used for such battery cells in the storage battery.

Figure 17:
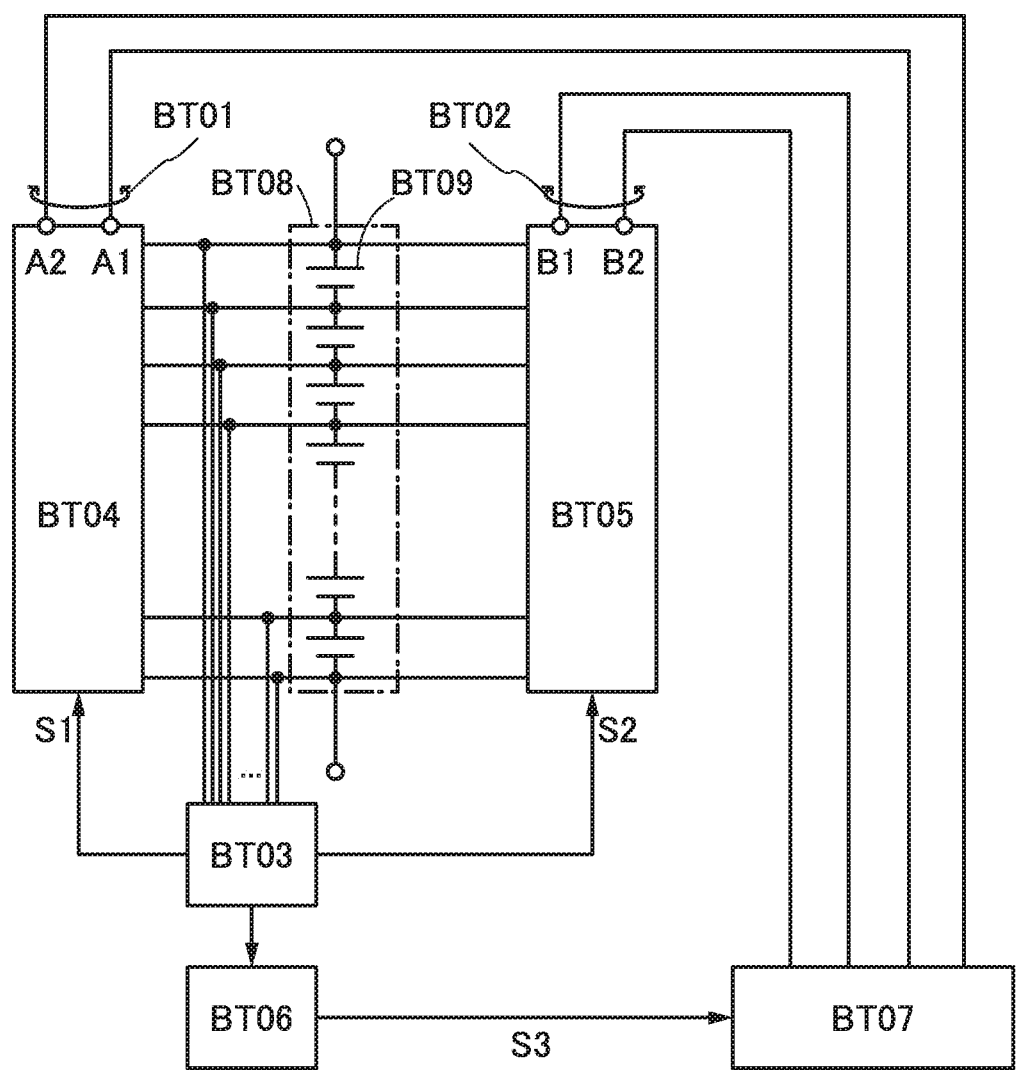
FIG. 17 is a block diagram illustrating one embodiment of the present invention.

FIG. 17 is an example of a block diagram of the storage battery. A storage battery BT00 illustrated in FIG. 17 includes a terminal pair BT01, a terminal pair BT02, a switching control circuit BT03, a switching circuit BT04, a switching circuit BT05, a voltage transformation control circuit BT06, a voltage transformer circuit BT07, and a battery portion BT08 including a plurality of battery cells BT09 connected in series.

In the storage battery BT00 illustrated in FIG. 17, a portion including the terminal pair BT01, the terminal pair BT02, the switching control circuit BT03, the switching circuit BT04, the switching circuit BT05, the voltage transformation control circuit BT06, and the voltage transformer circuit BT07 can be referred to as a battery management unit.

The switching control circuit BT03 controls operations of the switching circuits BT04 and BT05. Specifically, the switching control circuit BT03 selects battery cells to be discharged (a discharge battery cell group) and battery cells to be charged (a charge battery cell group) in accordance with voltage measured for every battery cell BT09.

Furthermore, the switching control circuit BT03 outputs a control signal S1 and a control signal S2 on the basis of the selected discharge battery cell group and the selected charge battery cell group. The control signal S1 is output to the switching circuit BT04. The control signal S1 controls the switching circuit BT04 so that the terminal pair BT01 and the discharge battery cell group are connected. In addition, the control signal S2 is output to the switching circuit BT05. The control signal S2 controls the switching circuit BT05 so that the terminal pair BT02 and the charge battery cell group are connected.

The switching control circuit BT03 generates the control signal S1 and the control signal S2 on the basis of the connection relation of the switching circuit BT04, the switching circuit BT05, and the voltage transformer circuit BT07 so that terminals having the same polarity of the terminal pair BT01 and the discharge battery cell group are connected with each other, or terminals having the same polarity of the terminal pair BT02 and the charge battery cell group are connected with each other.

The operations of the switching control circuit BT03 will be described in detail.

First, the switching control circuit BT03 measures the voltage of each of the plurality of battery cells BT09. Then, the switching control circuit BT03 determines that the battery cell BT09 having a voltage higher than a predetermined threshold value is a high-voltage battery cell (high-voltage cell) and that the battery cell BT09 having a voltage lower than the predetermined threshold value is a low-voltage battery cell (low-voltage cell), for example.

As a method to determine whether a battery cell is a high-voltage cell or a low-voltage cell, any of various methods can be employed. For example, the switching control circuit BT03 may determine whether each battery cell BT09 is a high-voltage cell or a low-voltage cell on the basis of the voltage of the battery cell BT09 having the highest voltage or the lowest voltage among the plurality of battery cells BT09. In this case, the switching control circuit BT03 can determine whether each battery cell BT09 is a high-voltage cell or a low-voltage cell by, for example, determining whether or not the ratio of the voltage of each battery cell BT09 to the reference voltage is the predetermined value or more. Then, the switching control circuit BT03 determines a charge battery cell group and a discharge battery cell group on the basis of the determination result.

Note that high-voltage cells and low-voltage cells are mixed in various states in the plurality of battery cells BT09. For example, the switching control circuit BT03 selects a portion having the largest number of high-voltage cells connected in series as the discharge battery cell group of mixed high-voltage cells and low-voltage cells. Furthermore, the switching control circuit BT03 selects a portion having the largest number of low-voltage cells connected in series as the charge battery cell group. In addition, the switching control circuit BT03 may preferentially select the battery cells BT09 which are almost overcharged or over-discharged as the discharge battery cell group or the charge battery cell group.

Figure 18A:
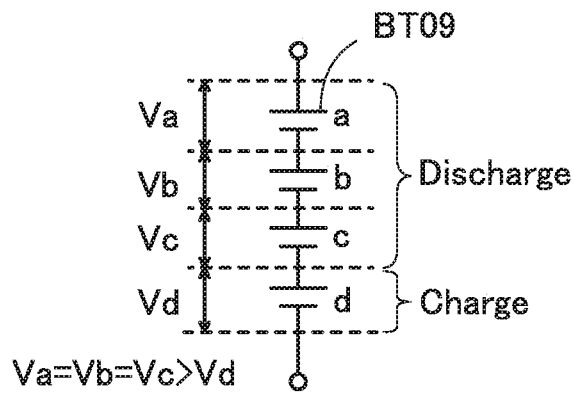
FIGS. 18A, 18B, and 18C are schematic views each illustrating one embodiment of the present invention.
Figure 18B:
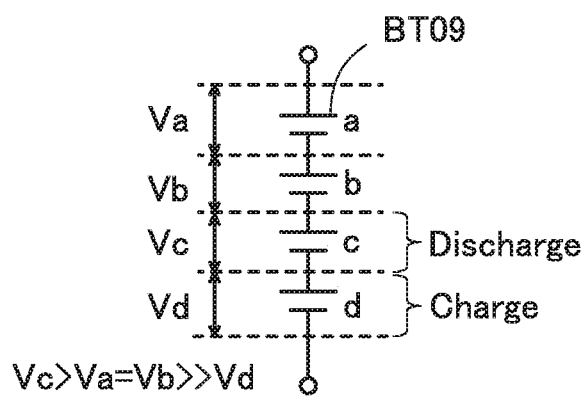
Figure 18C:
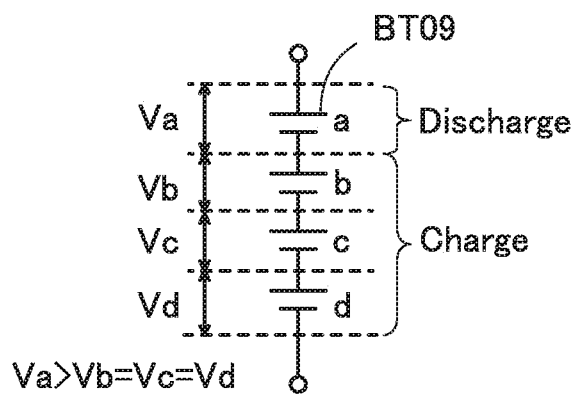

Here, operation examples of the switching control circuit BT03 in this embodiment will be described with reference to FIGS. 18A to 18C. FIGS. 18A to 18C illustrate the operation examples of the switching control circuit BT03. Note that FIGS. 18A to 18C each illustrate the case where four battery cells BT09 are connected in series as an example for convenience of explanation.

FIG. 18A shows the case where the relation of voltages Va, Vb, Vc, and Vd is Va=Vb=Vc>Vd where the voltages Va, Vb, Vc, and Vd are the voltages of a battery cell a, a battery cell b, a battery cell c, and a battery cell d, respectively. That is, a series of three high-voltage cells a to c and one low-voltage cell d are connected in series. In this case, the switching control circuit BT03 selects the series of three high-voltage cells a to c as the discharge battery cell group. In addition, the switching control circuit BT03 selects the low-voltage cell d as the charge battery cell group.

Next, FIG. 18B shows the case where the relation of the voltages is Vc>Va=Vb>>Vd. That is, a series of two low-voltage cells a and b, one high-voltage cell c, and one low-voltage cell d which is almost over-discharged are connected in series. In this case, the switching control circuit BT03 selects the high-voltage cell c as the discharge battery cell group. Since the low-voltage cell d is almost over-discharged, the switching control circuit BT03 preferentially selects the low-voltage cell d as the charge battery cell group instead of the series of two low-voltage cells a and b.

Lastly, FIG. 18C shows the case where the relation of the voltages is Va>Vb=Vc=Vd. That is, one high-voltage cell a and a series of three low-voltage cells b to d are connected in series. In this case, the switching control circuit BT03 selects the high-voltage cell a as the discharge battery cell group. In addition, the switching control circuit BT03 selects the series of three low-voltage cells b to d as the charge battery cell group.

On the basis of the determination result shown in the examples of FIGS. 18A to 18C, the switching control circuit BT03 outputs the control signal S1 and the control signal S2 to the switching circuit BT04 and the switching circuit BT05, respectively. Information showing the discharge battery cell group, which is the connection destination of the switching circuit BT04, is set in the control signal S1.

Information showing the charge battery cell group, which is the connection destination of the switching circuit BT05 is set in the control signal S2.

The above is the detailed description of the operations of the switching control circuit BT03.

The switching circuit BT04 sets the connection destination of the terminal pair BT01 at the discharge battery cell group selected by the switching control circuit BT03, in response to the control signal S1 output from the switching control circuit BT03.

The terminal pair BT01 includes a pair of terminals A1 and A2. The switching circuit BT04 connects one of the pair of terminals A1 and A2 to a positive electrode terminal of the battery cell BT09 positioned on the most upstream side (on the high potential side) of the discharge battery cell group, and the other to a negative electrode terminal of the battery cell BT09 positioned on the most downstream side (on the low potential side) of the discharge battery cell group. Note that the switching circuit BT04 can recognize the position of the discharge battery cell group on the basis of the information set in the control signal S1.

The switching circuit BT05 sets the connection destination of the terminal pair BT02 at the charge battery cell group selected by the switching control circuit BT03, in response to the control signal S2 output from the switching control circuit BT03.

The terminal pair BT02 includes a pair of terminals B1 and B2. The switching circuit BT05 sets the connection destination of the terminal pair BT02 by connecting one of the pair of terminals B1 and B2 to a positive electrode terminal of the battery cell BT09 positioned on the most upstream side (on the high potential side) of the charge battery cell group, and the other to a negative electrode terminal of the battery cell BT09 positioned on the most downstream side (on the low potential side) of the charge battery cell group. Note that the switching circuit BT05 can recognize the position of the charge battery cell group on the basis of the information set in the control signal S2.

Figure 19:
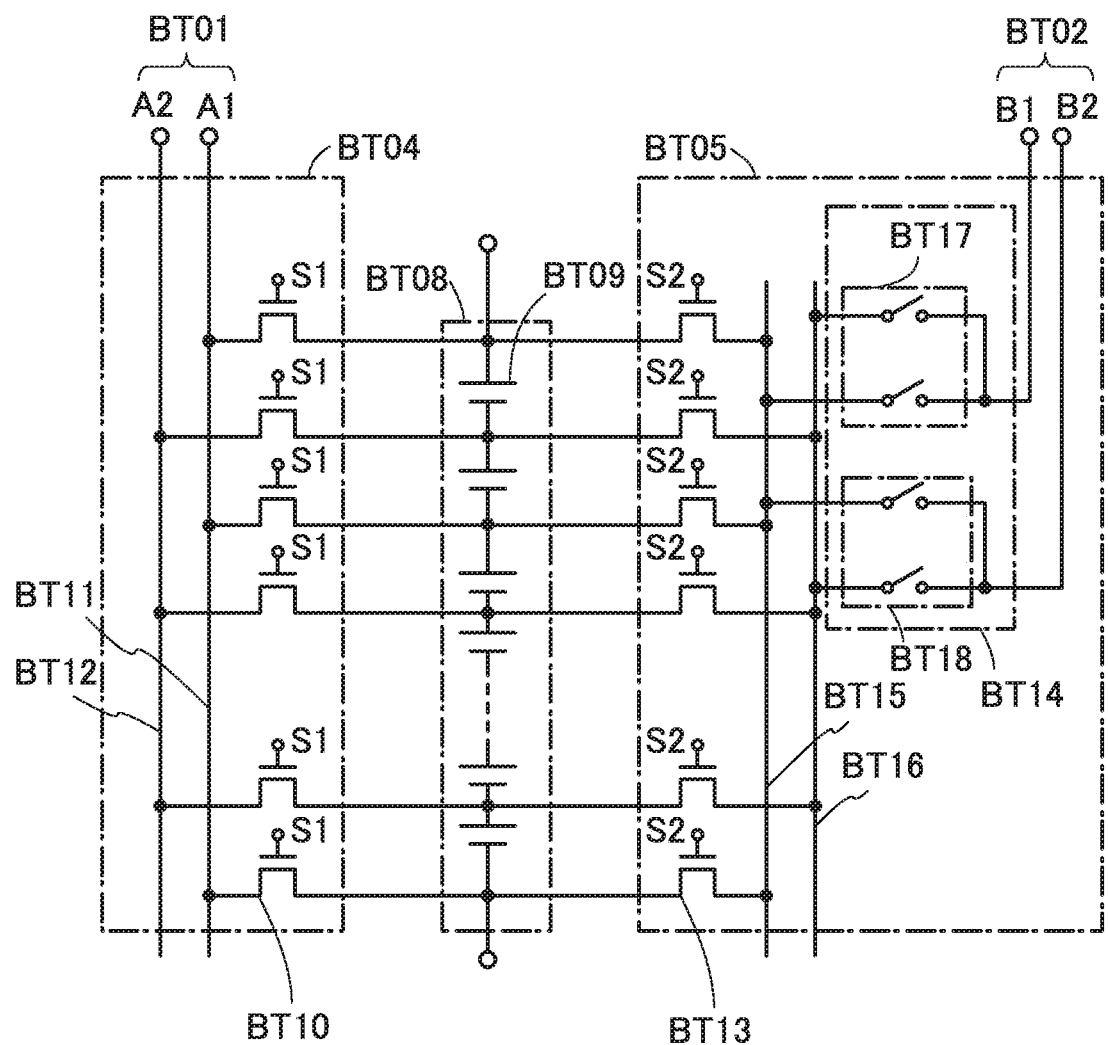
FIG. 19 is a circuit diagram illustrating one embodiment of the present invention.
Figure 20:
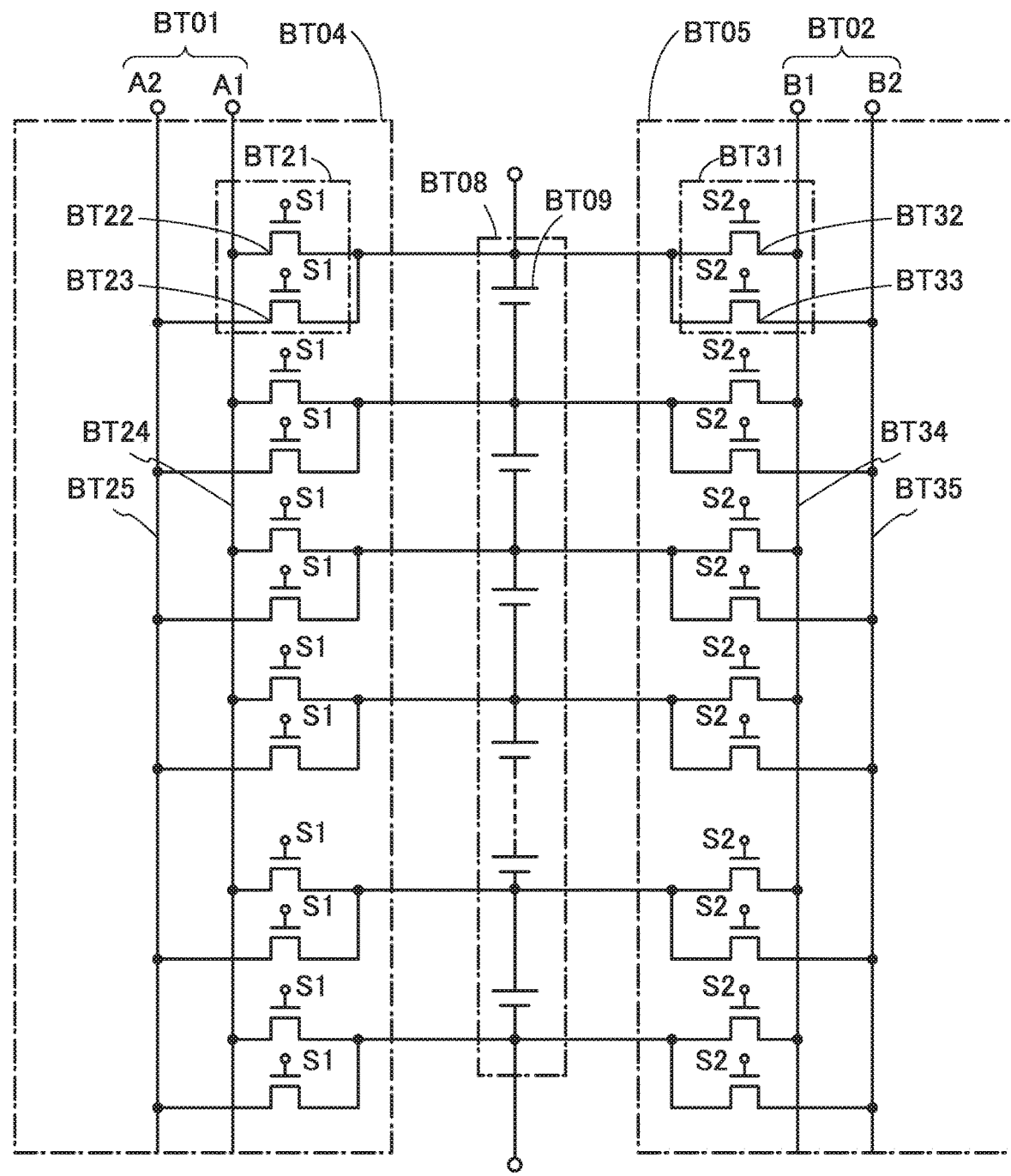
FIG. 20 is a circuit diagram illustrating one embodiment of the present invention.

FIG. 19 and FIG. 20 are circuit diagrams showing configuration examples of the switching circuits BT04 and BT05.

In FIG. 19, the switching circuit BT04 includes a plurality of transistors BT10, a bus BT11, and a bus BT12. The bus BT11 is connected to the terminal A1. The bus BT12 is connected to the terminal A2. Sources or drains of the plurality of transistors BT10 are connected alternately to the bus BT11 and the bus BT12. The sources or drains which are not connected to the bus BT11 and the bus BT12 of the plurality of transistors BT10 are each connected between two adjacent battery cells BT09.

The source or drain of the transistor BT10 which is not connected to the bus BT12 on the most upstream side of the plurality of transistors BT10 is connected to the positive electrode terminal of the battery cell BT09 on the most upstream side of the battery portion BT08. The source or drain of the transistor BT10 which is not connected to the bus BT12 of the transistor BT10 on the most downstream side of the plurality of transistors BT10 is connected to the negative electrode terminal of the battery cell BT09 on the most downstream side of the battery portion BT08.

The switching circuit BT04 connects the discharge battery cell group to the terminal pair BT01 by bringing one of the plurality of transistors BT10 which are connected to the bus BT11 and one of the plurality of transistors BT10 which are connected to the bus BT12 into an on state in response to the control signal S1 supplied to gates of the plurality of transistors BT10. Accordingly, the positive electrode terminal of the battery cell BT09 on the most upstream side of the discharge battery cell group is connected to one of the pair of terminals A1 and A2. In addition, the negative electrode terminal of the battery cell BT09 on the most downstream side of the discharge battery cell group is connected to the other of the pair of terminals A1 and A2 (i.e., a terminal which is not connected to the positive electrode terminal).

An OS transistor is preferably used as the transistor BT10. Since the off-state current of the OS transistor is low, the amount of charge that leaks from the battery cell which does not belong to the discharge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT01, which are connected to the transistor BT10 in an off state, can be insulated from each other even when the output voltage of the discharge battery cell group is high.

In FIG. 19, the switching circuit BT05 includes a plurality of transistors BT13, a current control switch BT14, a bus BT15, and a bus BT16. The bus BT15 and the bus BT16 are provided between the plurality of transistors BT13 and the current control switch BT14. Sources or drains of the plurality of transistors BT13 are connected alternately to the bus BT15 and the bus BT16. The sources or drains which are not connected to the bus BT15 and the bus BT16 of the plurality of transistors BT13 are each connected between two adjacent battery cells BT09.

The source or drain of the transistor BT13 which is not connected to the bus BT16 on the most upstream side of the plurality of transistors BT13 is connected to the positive electrode terminal of the battery cell BT09 on the most upstream side of the battery portion BT08. The source or a drain of the transistor BT13 which is not connected to the bus BT16 on the most downstream side of the plurality of transistors BT13 is connected to the negative electrode terminal of the battery cell BT09 on the most downstream side of the battery portion BT08.

An OS transistor is preferably used as the transistors BT13 like the transistors BT10. Since the off-state current of the OS transistor is low, the amount of charge that leaks from the battery cells which do not belong to the charge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT02, which are connected to the transistor BT13 in an off state, can be insulated from each other even when a voltage for charging the charge battery cell group is high.

The current control switch BT14 includes a switch pair BT17 and a switch pair BT18. Terminals on one end of the switch pair BT17 are connected to the terminal B1. Terminals on the other end of the switch pair BT17 extend from two switches. One switch is connected to the bus BT15, and the other switch is connected to the bus BT16. Terminals on one end of the switch pair BT18 are connected to the terminal B2. Terminals on the other end of the switch pair BT18 extend from two switches. One switch is connected to the bus BT15, and the other switch is connected to the bus BT16.

OS transistors are preferably used for the switches included in the switch pair BT17 and the switch pair BT18 like the transistors BT10 and BT13.

The switching circuit BT05 connects the charge battery cell group and the terminal pair BT02 by controlling the combination of on and off states of the transistors BT13 and the current control switch BT14 in response to the control signal S2.

For example, the switching circuit BT05 connects the charge battery cell group and the terminal pair BT02 in the following manner.

The switching circuit BT05 brings a transistor BT13 connected to the positive electrode terminal of the battery cell BT09 on the most upstream side of the charge battery cell group into an on state in response to the control signal S2 supplied to gates of the plurality of transistors BT13. In addition, the switching circuit BT05 brings a transistor BT13 connected to the negative electrode terminal of the battery cell BT09 on the most downstream side of the charge battery cell group into an on state in response to the control signal S2 supplied to the gates of the plurality of transistors BT13.

The polarities of voltages applied to the terminal pair BT02 can vary in accordance with the configurations of the voltage transformer circuit BT07 and the discharge battery cell group connected to the terminal pair BT01. In order to supply a current in the direction for charging the charge battery cell group, terminals with the same polarity of the terminal pair BT02 and the charge battery cell group are required to be connected to each other. In view of this, the current control switch BT14 is controlled by the control signal S2 so that the connection destination of the switch pair BT17 and that of the switch pair BT18 are changed in accordance with the polarities of the voltages applied to the terminal pair BT02.

The state where voltages are applied to the terminal pair BT02 so as to make the terminal B1 a positive electrode and the terminal B2 a negative electrode will be described as an example. Here, in the case where the battery cell BT09 positioned on the most downstream side of the battery portion BT08 is in the charge battery cell group, the switch pair BT17 is controlled to be connected to the positive electrode terminal of the battery cell BT09 in response to the control signal S2. That is, the switch of the switch pair BT17 connected to the bus BT16 is turned on, and the switch of the switch pair BT17 connected to the bus BT15 is turned off. In contrast, the switch pair BT18 is controlled to be connected to the negative electrode terminal of the battery cell BT09 positioned on the most downstream side of the battery portion BT08 in response to the control signal S2. That is, the switch of the switch pair BT18 connected to the bus BT15 is turned on, and the switch of the switch pair BT18 connected to the bus BT16 is turned off. In this manner, terminals with the same polarity of the terminal pair BT02 and the charge battery cell group are connected to each other. In addition, the current which flows from the terminal pair BT02 is controlled to be supplied in a direction so as to charge the charge battery cell group.

In addition, instead of the switching circuit BT05, the switching circuit BT04 may include the current control switch BT14. In that case, the polarities of the voltages applied to the terminal pair BT02 are controlled by controlling the polarities of the voltages applied to the terminal pair BT01 in response to the operation of the current control switch BT14 and the control signal S1. Thus, the current control switch BT14 controls the direction of current which flows to the charge battery cell group from the terminal pair BT02.

FIG. 20 is a circuit diagram illustrating configuration examples of the switching circuit BT04 and the switching circuit BT05 which are different from those of FIG. 19.

In FIG. 20, the switching circuit BT04 includes a plurality of transistor pairs BT21, a bus BT24, and a bus BT25. The bus BT24 is connected to the terminal A1. The bus BT25 is connected to the terminal A2. Terminals on one end of each of the plurality of transistor pairs BT21 extend from a transistor BT22 and a transistor BT23. Sources or drains of the transistors BT22 are connected to the bus BT24. Sources or drains of the transistors BT23 are connected to the bus BT25. In addition, terminals on the other end of each of the plurality of transistor pairs are connected between two adjacent battery cells BT09. The terminals on the other end of the transistor pair BT21 on the most upstream side of the plurality of transistor pairs BT21 are connected to the positive electrode terminal of the battery cell BT09 on the most upstream side of the battery portion BT08. The terminals on the other end of the transistor pair BT21 on the most downstream side of the plurality of transistor pairs BT21 are connected to a negative electrode terminal of the battery cell BT09 on the most downstream side of the battery portion BT08.

The switching circuit BT04 switches the connection destination of the transistor pair BT21 to one of the terminal A1 and the terminal A2 by turning on or off the transistors BT22 and BT23 in response to the control signal S1. Specifically, when the transistor BT22 is turned on, the transistor BT23 is turned off, so that the connection destination of the transistor pair BT21 is the terminal A1. On the other hand, when the transistor BT23 is turned on, the transistor BT22 is turned off, so that the connection destination of the transistor pair BT21 is the terminal A2. Which of the transistors BT22 and BT23 is turned on is determined by the control signal S1.

Two transistor pairs BT21 are used to connect the terminal pair BT01 and the discharge battery cell group. Specifically, the connection destinations of the two transistor pairs BT21 are determined on the basis of the control signal S1, and the discharge battery cell group and the terminal pair BT01 are connected. The connection destinations of the two transistor pairs BT21 are controlled by the control signal S1 so that one of the connection destinations is the terminal A1 and the other is the terminal A2.

The switching circuit BT05 includes a plurality of transistor pairs BT31, a bus BT34, and a bus BT35. The bus BT34 is connected to the terminal B1. The bus BT35 is connected to the terminal B2. Terminals on one end of each of the plurality of transistor pairs BT31 extend from a transistor BT32 and a transistor BT33. The terminal on one end extending from the transistor BT32 is connected to the bus BT34. The terminal on one end extending from the transistor BT33 is connected to the bus BT35. Terminals on the other end of each of the plurality of transistor pairs BT31 are connected between two adjacent battery cells BT09. The terminal on the other end of the transistor pair BT31 on the most upstream side of the plurality of transistor pairs BT31 is connected to the positive electrode terminal of the battery cell BT09 on the most upstream side of the battery portion BT08. The terminal on the other end of the transistor pair BT31 on the most downstream side of the plurality of transistor pairs BT31 is connected to the negative electrode terminal of the battery cell BT09 on the most downstream side of the battery portion BT08.

The switching circuit BT05 switches the connection destination of the transistor pair BT31 to one of the terminal B1 and the terminal B2 by turning on or off the transistors BT32 and BT33 in response to the control signal S2. Specifically, when the transistor BT32 is turned on, the transistor BT33 is turned off, so that the connection destination of the transistor pair BT31 is the terminal B1. On the other hand, when the transistor BT33 is turned on, the transistor BT32 is turned off, so that the connection destination of the transistor pair BT31 is the terminal B2. Which of the transistors BT32 and BT33 is turned on is determined by the control signal S2.

Two transistor pairs BT31 are used to connect the terminal pair BT02 and the charge battery cell group. Specifically, the connection destinations of the two transistor pairs BT31 are determined on the basis of the control signal S2, and the charge battery cell group and the terminal pair BT02 are connected. The connection destinations of the two transistor pairs BT31 are controlled by the control signal S2 so that one of the connection destinations is the terminal B1 and the other is the terminal B2.

The connection destinations of the two transistor pairs BT31 are determined by the polarities of the voltages applied to the terminal pair BT02. Specifically, in the case where voltages which make the terminal B1 a positive electrode and the terminal B2 a negative electrode are applied to the terminal pair BT02, the transistor pair BT31 on the upstream side is controlled by the control signal S2 so that the transistor BT32 is turned on and the transistor BT33 is turned off. In contrast, the transistor pair BT31 on the downstream side is controlled by the control signal S2 so that the transistor BT33 is turned on and the transistor BT32 is turned off. In the case where voltages which make the terminal B1 a negative electrode and the terminal B2 a positive electrode are applied to the terminal pair BT02, the transistor pair BT31 on the upstream side is controlled by the control signal S2 so that the transistor BT33 is turned on and the transistor BT32 is turned off. In contrast, the transistor pair BT31 on the downstream side is controlled by the control signal S2 so that the transistor BT32 is turned on and the transistor BT33 is turned off. In this manner, terminals with the same polarity of the terminal pair BT02 and the charge battery cell group are connected to each other. In addition, the current which flows from the terminal pair BT02 is controlled to be supplied in the direction for charging the charge battery cell group.

The voltage transformation control circuit BT06 controls the operation of the voltage transformer circuit BT07. The voltage transformation control circuit BT06 generates a voltage transformation signal S3 for controlling the operation of the voltage transformer circuit RT07 on the basis of the number of the battery cells RT09 included in the discharge battery cell group and the number of the battery cells BT09 included in the charge battery cell group and outputs the voltage transformation signal S3 to the voltage transformer circuit BT07.

In the case where the number of the battery cells BT09 included in the discharge battery cell group is larger than that included in the charge battery cell group, it is necessary to prevent a charging voltage which is too high from being applied to the charge battery cell group. Thus, the voltage transformation control circuit BT06 outputs the voltage transformation signal S3 for controlling the voltage transformer circuit BT07 so that a discharging voltage (Vdis) is lowered within a range where the charge battery cell group can be charged.

In the case where the number of the battery cells BT09 included in the discharge battery cell group is less than or equal to that included in the charge battery cell group, a charging voltage necessary for charging the charge battery cell group needs to be ensured. Therefore, the voltage transformation control circuit BT06 outputs the voltage transformation signal S3 for controlling the voltage transformer circuit BT07 so that the discharging voltage (Vdis) is raised within a range where a charging voltage which is too high is not applied to the charge battery cell group.

The voltage value of the charging voltage which is too high is determined in the light of product specifications and the like of the battery cell BT09 used in the battery portion BT08. The voltage which is raised or lowered by the voltage transformer circuit BT07 is applied as a charging voltage (Vcha) to the terminal pair BT02.

Figure 21A:
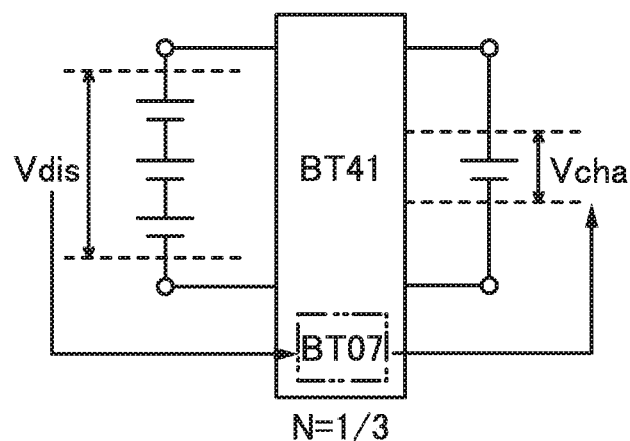
FIGS. 21A to 21C are schematic views each illustrating one embodiment of the present invention.
Figure 21B:
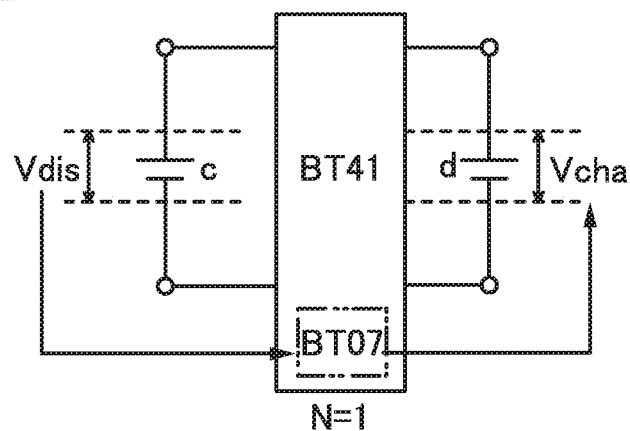
Figure 21C:
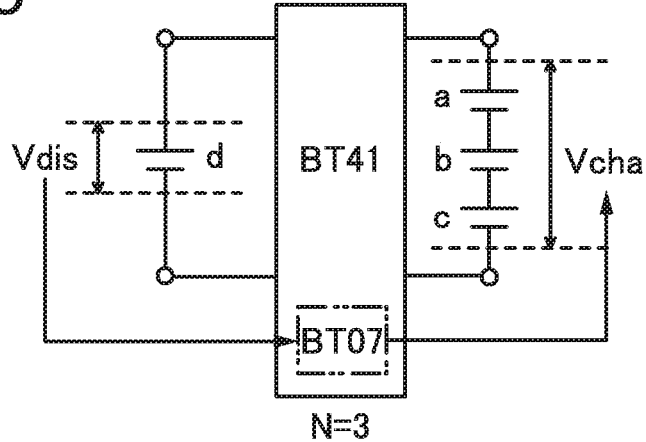

Here, operation examples of the voltage transformation control circuit BT06 in this embodiment will be described with reference to FIGS. 21A to 21C. FIGS. 21A to 21C are conceptual diagrams for explaining the operation examples of the voltage transformation control circuit BT06 corresponding to the discharge battery cell group and the charge battery cell group described in FIGS. 18A to 18C. FIGS. 21A to 21C each illustrate a battery control unit BT41. The battery control unit BT41 includes the terminal pair BT01, the terminal pair BT02, the switching control circuit BT03, the switching circuit BT04, the switching circuit BT05, the voltage transformation control circuit BT06, and the voltage transformer circuit BT07.

In an example illustrated in FIG. 21A, the series of three high-voltage cells a to c and one low-voltage cell d are connected in series as described in FIG. 18A. In this case, as described using FIG. 18A, the switching control circuit BT03 selects the high-voltage cells a to c as the discharge battery cell group, and selects the low-voltage cell d as the charge battery cell group. The voltage transformation control circuit BT06 calculates a conversion ratio N for converting the discharging voltage (Vdis) into the charging voltage (Vcha) based on the ratio of the number of the battery cells BT09 included in the charge battery cell group to the number of the battery cells BT09 included in the discharge battery cell group.

In the case where the number of the battery cells BT09 included in the discharge battery cell group is larger than that included in the charge battery cell group, when a discharging voltage is applied to the terminal pair BT02 without transforming the voltage, an overvoltage may be applied to the battery cells BT09 included in the charge battery cell group through the terminal pair BT02. Thus, in the case of FIG. 21A, it is necessary that a charging voltage (Vcha) applied to the terminal pair BT02 be lower than the discharging voltage. In addition, in order to charge the charge battery cell group, it is necessary that the charging voltage be higher than the total voltage of the battery cells BT09 included in the charge battery cell group. Thus, the voltage transformation control circuit BT06 sets the conversion ratio N larger than the ratio of the number of the battery cells BT09 included in the charge battery cell group to the number of the battery cells BT09 included in the discharge battery cell group.

Thus, the voltage transformation control circuit BT06 preferably sets the conversion ratio N larger than the ratio of the number of the battery cells BT09 included in the charge battery cell group to the number of the battery cells BT09 included in the discharge battery cell group by about 1% to 10%. Here, the charging voltage is made higher than the voltage of the charge battery cell group, but the charging voltage is equal to the voltage of the charge battery cell group in reality. Note that the voltage transformation control circuit BT06 feeds a current for charging the charge battery cell group in accordance with the conversion ratio N in order to make the voltage of the charge battery cell group equal to the charging voltage. The value of the current is set by the voltage transformation control circuit BT06.

In the example illustrated in FIG. 21A, since the number of the battery cells BT09 included in the discharge battery cell group is three and the number of the battery cells BT09 included in the charge battery cell group is one, the voltage transformation control circuit BT06 calculates a value which is slightly larger than ⅓ as the conversion ratio N. Then, the voltage transformation control circuit BT06 outputs the voltage transformation signal S3, which lowers the discharging voltage in accordance with the conversion ratio N and converts the voltage into a charging voltage, to the voltage transformer circuit BT07. The voltage transformer circuit BT07 applies the charging voltage which is obtained by transformation in response to the voltage transformation signal S3 to the terminal pair BTG2. Then, the battery cells BT09 included in the charge battery cell group are charged with the charging voltage applied to the terminal pair BT02.

In each of examples illustrated in FIGS. 21B and 21C, the conversion ratio N is calculated in a manner similar to that of FIG. 21A. In each of the examples illustrated in FIGS. 21B and 21C, since the number of the battery cells BT09 included in the discharge battery cell group is less than or equal to the number of the battery cells BT09 included in the charge battery cell group, the conversion ratio N is 1 or more. Therefore, in this case, the voltage transformation control circuit BT06 outputs the voltage transformation signal S3 for raising the discharging voltage and converting the voltage into the charging voltage.

The voltage transformer circuit BT07 converts the discharging voltage applied to the terminal pair BT01 into a charging voltage in response to the voltage transformation signal S3. The voltage transformer circuit BT07 applies the charging voltage to the terminal pair BT02. Here, the voltage transformer circuit BT07 electrically insulates the terminal pair BT01 from the terminal pair BT02. Accordingly, the voltage transformer circuit BT07 prevents a short circuit due to a difference between the absolute voltage of the negative electrode terminal of the battery cell BT09 on the most downstream side of the discharge battery cell group and the absolute voltage of the negative electrode terminal of the battery cell BT09 on the most downstream side of the charge battery cell group. Furthermore, the voltage transformer circuit BT07 converts the discharging voltage, which is the total voltage of the discharge battery cell group, into the charging voltage in response to the voltage transformation signal S3 as described above.

An insulated direct current (DC)-DC converter or the like can be used in the voltage transformer circuit BT07. In that case, the voltage transformation control circuit BT06 controls the charging voltage converted by the voltage transformer circuit BT07 by outputting a signal for controlling the on/off ratio (the duty ratio) of the insulated DC-DC converter as the voltage transformation signal S3.

Examples of the insulated DC-DC converter include a flyback converter, a forward converter, a ringing choke converter (RCC), a push-pull converter, a half-bridge converter, and a full-bridge converter, and a suitable converter is selected in accordance with the value of the intended output voltage.

Figure 22:
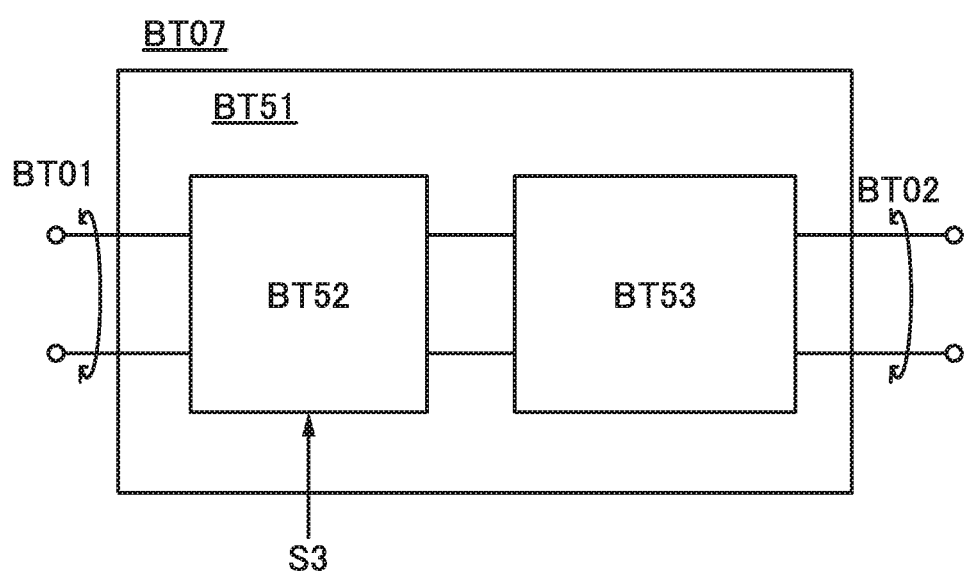
FIG. 22 is a block diagram illustrating one embodiment of the present invention.

The configuration of the voltage transformer circuit BT07 including the insulated DC-DC converter is illustrated in FIG. 22. An insulated DC-DC converter BT51 includes a switch portion BT52 and a transformer BT53. The switch portion BT52 is a switch for switching on/off of the insulated DC-DC converter, and a metal oxide semiconductor field-effect transistor (MOSFET), a bipolar transistor, or the like is used as the switch portion BT52. The switch portion BT52 periodically turns on and off the insulated DC-DC converter BT51 in response to the voltage transformation signal S3 for controlling the on/off ratio which is output from the voltage transformation control circuit BT06. The switch portion BT52 can have any of various structures in accordance with the type of the insulated DC-DC converter which is used. The transformer BT53 converts the discharging voltage applied from the terminal pair BT01 into the charging voltage. In detail, the transformer BT53 operates in conjunction with the on/off state of the switch portion BT52 and converts the discharging voltage into the charging voltage in accordance with the on-off ratio. As the time during which the switch portion BT52 is on becomes longer in its switching period, the charging voltage is increased. On the other hand, as the time during which the switch portion BT52 is on becomes shorter in its switching period, the charging voltage is decreased. In the case where the insulated DC-DC converter is used, the terminal pair BT01 and the terminal pair BT02 can be insulated from each other inside the transformer BT53.

Figure 23:
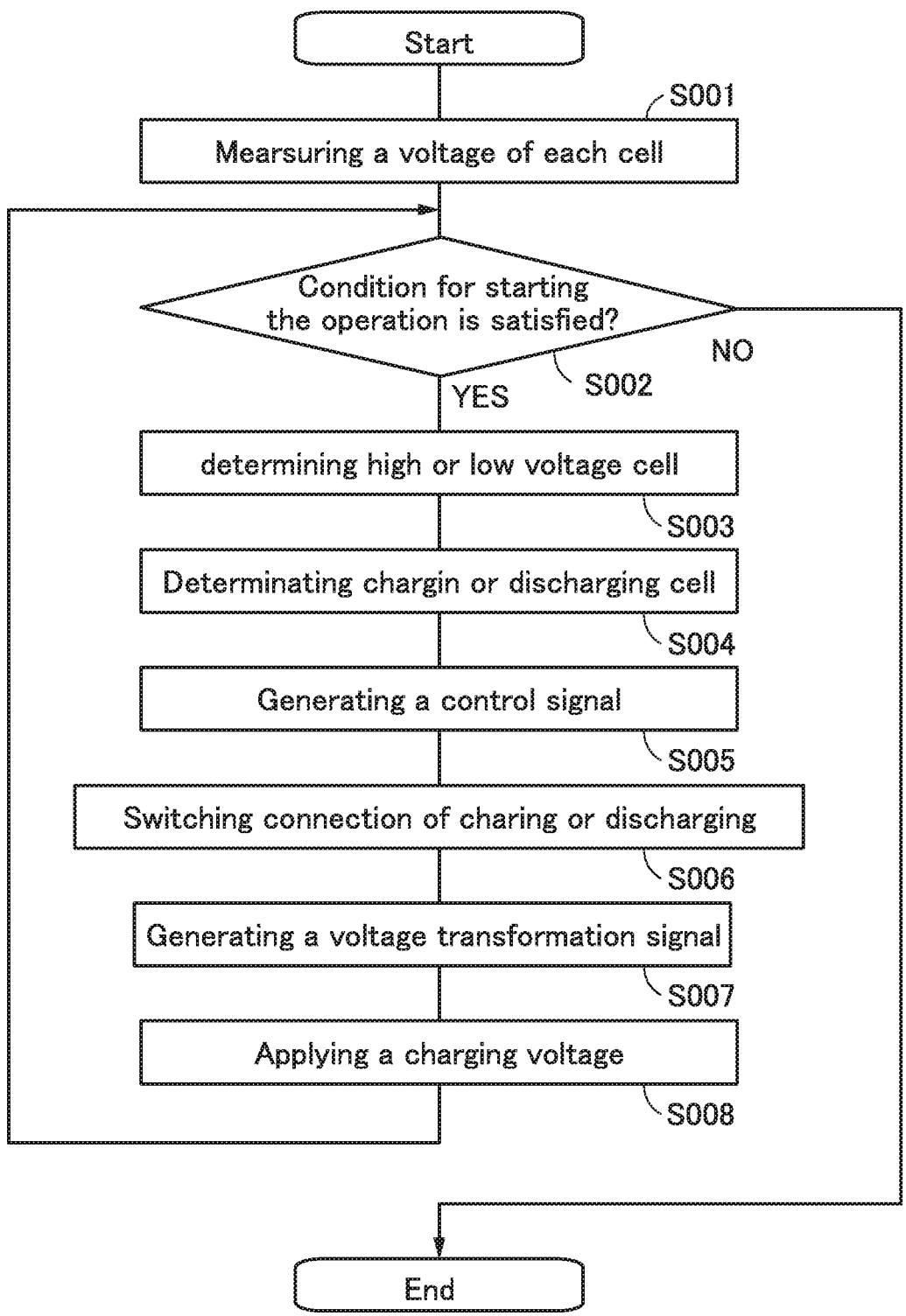
FIG. 23 is a flow chart showing one embodiment of the present invention.

A flow of operations of the storage battery BT00 in this embodiment will be described with reference to FIG. 23. FIG. 23 is a flow chart showing the flow of the operations of the storage battery BT00.

First, the storage battery BT00 obtains a voltage measured for each of the plurality of battery cells B109 (step S001). Then, the storage battery BT00 determines whether or not the condition for starting the operation of reducing variations in voltage of the plurality of battery cells BT09 is satisfied (step S002). An example of the condition can be that the difference between the maximum value and the minimum value of the voltage measured for each of the plurality of battery cells BT09 is higher than or equal to the predetermined threshold value. In the case where the condition is not satisfied (step S002: NO), the storage battery BT00 does not perform the following operation because voltages of the battery cells BT09 are well balanced. In contrast, in the case where the condition is satisfied (step S002: YES), the storage battery BT00 performs the operation of reducing variations in the voltage of the battery cells BT09. In this operation, the storage battery BT00 determines whether each battery cell BT09 is a high voltage cell or a low voltage cell on the basis of the measured voltage of each cell (step S003). Then, the storage battery BT00 determines a discharge battery cell group and a charge battery cell group on the basis of the determination result (step S004). In addition, the storage battery BT00 generates the control signal S1 for setting the connection destination of the terminal pair BT01 to the determined discharge battery cell group, and the control signal S2 for setting the connection destination of the terminal pair BT02 to the determined charge battery cell group (step S005). The storage battery BT00 outputs the generated control signals S1 and S2 to the switching circuit BT04 and the switching circuit BT05, respectively. Then, the switching circuit BT04 connects the terminal pair BT01 and the discharge battery cell group, and the switching circuit BT05 connects the terminal pair BT02 and the discharge battery cell group (step S006). The storage battery BT00 generates the voltage transformation signal S3 based on the number of the battery cells BT09 included in the discharge battery cell group and the number of the battery cells BT09 included in the charge battery cell group (step S007). Then, the storage battery BT00 converts, in response to the voltage transformation signal S3, the discharging voltage applied to the terminal pair BT01 into a charging voltage and applies the charging voltage to the terminal pair BT02 (step S008). In this way, charge of the discharge battery cell group is transferred to the charge battery cell group.

Although the plurality of steps are shown in order in the flow chart of FIG. 23, the order of performing the steps is not limited to the order.

According to the above embodiment, when charge is transferred from the discharge battery cell group to the charge battery cell group, a structure where charge from the discharge battery cell group is temporarily stored, and the stored charge is sent to the charge battery cell group is unnecessary, unlike in the a capacitive type circuit. Accordingly, the charge transfer efficiency per unit time can be increased. In addition, the switching circuit BT04 and the switching circuit BT05 determine which battery cell in the discharge battery cell group and the charge battery cell group to be connected to the voltage transformer circuit.

Furthermore, the voltage transformer circuit BT07 converts the discharging voltage applied to the terminal pair BT01 into the charging voltage based on the number of the battery cells BT09 included in the discharge battery cell group and the number of the battery cells BT09 included in the charge battery cell group, and applies the charging voltage to the terminal pair BT02. Thus, charge can be transferred without any problems regardless of how the battery cells BT09 are selected as the discharge battery cell group and the charge battery cell group.

Furthermore, the use of OS transistors as the transistor BT10 and the transistor BT13 can reduce the amount of charge that leaks from the battery cells BT09 not belonging to the charge battery cell group or the discharge battery cell group. Accordingly, a decrease in capacity of the battery cells BT09 which do not contribute to charging or discharging can be suppressed. In addition, the variations in characteristics of the OS transistor due to heat are smaller than those of an Si transistor. Accordingly, even when the temperature of the battery cells BT09 is increased, an operation such as turning on or off the transistors in response to the control signals S1 and S2 can be performed normally.

This embodiment can be implemented in combination with any of the other embodiments as appropriate.

This application is based on Japanese Patent Application serial no. 2014-239736 filed with Japan Patent Office on Nov. 27, 2014, the entire contents of which are hereby incorporated by reference.

What is claimed is:

1. A storage battery comprising:
a positive electrode;
a negative electrode;
a separator between the positive electrode and the negative electrode;
an exterior body surrounding the positive electrode, the negative electrode, and the separator;
a wiring provided along the exterior body; and
a circuit configured to detect damage to the wiring,
wherein one terminal of the wiring is electrically connected to the positive electrode, and
wherein the other terminal of the wiring is electrically connected to the positive electrode through the circuit.

2. A storage battery comprising:
a positive electrode;
a negative electrode
a tab electrode;
a wiring;
a separator between the positive electrode and the negative electrode;
an exterior body surrounding the positive electrode, the negative electrode, and the separator; and
a circuit configured to detect damage to the wiring,
wherein the tab electrode is connected to one of the positive electrode and the negative electrode,
wherein the wiring is provided along the tab electrode,
wherein one terminal of the wiring is electrically connected to the positive electrode, and
wherein the other terminal of the wiring is electrically connected to the positive electrode.

* * * * *